(12) United States Patent
Dai et al.

(10) Patent No.: US 11,486,578 B2
(45) Date of Patent: Nov. 1, 2022

(54) MULTI-WALLED STRUCTURE FOR A GAS TURBINE ENGINE

(71) Applicant: Raytheon Technologies Corporation, Farmington, CT (US)

(72) Inventors: Zhongtao Dai, West Hartford, CT (US); Won-Wook Kim, Bloomfield, CT (US)

(73) Assignee: Raytheon Technologies Corporation, Farmington, CT (US)

(*) Notice: Subject to any disclaimer, the term of this patent is extended or adjusted under 35 U.S.C. 154(b) by 213 days.

(21) Appl. No.: 16/883,266

(22) Filed: May 26, 2020

(65) Prior Publication Data

US 2021/0372620 A1 Dec. 2, 2021

(51) Int. Cl.
*F23R 3/08* (2006.01)
*F02C 7/18* (2006.01)
*F23R 3/44* (2006.01)

(52) U.S. Cl.
CPC ............... *F23R 3/08* (2013.01); *F02C 7/18* (2013.01); *F23R 3/44* (2013.01)

(58) Field of Classification Search
CPC ................. F23R 3/08; F23R 3/44; F02C 7/18
See application file for complete search history.

(56) References Cited

U.S. PATENT DOCUMENTS

| | | | |
|---|---|---|---|
| 6,247,896 B1 | 6/2001 | Auxier | |
| 6,470,685 B2 * | 10/2002 | Pidcock | F23R 3/002 60/757 |
| 7,658,590 B1 | 2/2010 | Spanks | |
| 7,789,626 B1 | 9/2010 | Liang | |
| 9,518,738 B2 | 12/2016 | Gerendas | |
| 9,765,968 B2 | 9/2017 | Gage | |
| 10,393,022 B2 | 8/2019 | Harding | |
| 10,494,928 B2 | 12/2019 | Harding | |
| 2002/0076541 A1 | 6/2002 | Jarmon | |
| 2006/0059916 A1 | 3/2006 | Cheung | |

(Continued)

FOREIGN PATENT DOCUMENTS

| | | |
|---|---|---|
| EP | 1063388 B1 | 12/2005 |
| EP | 1635119 A2 | 3/2006 |

(Continued)

OTHER PUBLICATIONS

EP search report for EP21175625.9 dated Sep. 16, 2021.

(Continued)

*Primary Examiner* — Shafiq Mian
(74) *Attorney, Agent, or Firm* — Getz Balich LLC

(57) ABSTRACT

An assembly is provided for a gas turbine engine. This assembly includes a multi-walled structure including a cold wall, a hot wall and a cooling cavity vertically between the cold wall and the hot wall. The cold wall includes a plurality of cold wall apertures fluidly coupled with the cooling cavity. The cold wall apertures are configured to subject the cold wall to a cold wall pressure drop vertically across the cold wall. The hot wall includes a plurality of hot wall apertures fluid coupled with the cooling cavity. The hot wall apertures are configured to subject the hot wall to a hot wall pressure drop vertically across the hot wall that is greater than or equal to the cold wall pressure drop.

20 Claims, 17 Drawing Sheets

(56) References Cited

U.S. PATENT DOCUMENTS

| | | | |
|---|---|---|---|
| 2007/0245742 A1* | 10/2007 | Dahlke | F23R 3/005 |
| | | | 60/754 |
| 2010/0068033 A1 | 3/2010 | Liang | |
| 2010/0229564 A1 | 9/2010 | Chila | |
| 2010/0239412 A1 | 9/2010 | Draper | |
| 2010/0272953 A1 | 10/2010 | Yankowich | |
| 2012/0121381 A1 | 5/2012 | Charron | |
| 2012/0272521 A1 | 11/2012 | Lee | |
| 2013/0318975 A1 | 12/2013 | Stoia | |
| 2014/0093669 A1* | 4/2014 | Degel | B23K 26/389 |
| | | | 428/36.4 |
| 2014/0096528 A1* | 4/2014 | Cunha | F23R 3/16 |
| | | | 60/754 |
| 2014/0202163 A1 | 7/2014 | Johnson | |
| 2014/0260282 A1 | 9/2014 | Pinnick | |
| 2014/0331641 A1 | 11/2014 | Reinert | |
| 2014/0338347 A1* | 11/2014 | Gage | F23R 3/50 |
| | | | 60/754 |
| 2015/0027127 A1* | 1/2015 | Clemen | F23R 3/002 |
| | | | 60/752 |
| 2015/0226433 A1 | 8/2015 | Dudebout | |
| 2016/0123156 A1 | 5/2016 | Hucker | |
| 2016/0230993 A1 | 8/2016 | Dai | |
| 2016/0356500 A1 | 12/2016 | Bouldin | |
| 2018/0058222 A1* | 3/2018 | Varney | F01D 5/186 |
| 2019/0277501 A1 | 9/2019 | Xu | |
| 2020/0165922 A1* | 5/2020 | Varney | F01D 9/065 |

FOREIGN PATENT DOCUMENTS

| | | |
|---|---|---|
| EP | 1215183 B1 | 4/2009 |
| EP | 2246623 A1 | 11/2010 |
| EP | 2829804 B1 | 5/2016 |

OTHER PUBLICATIONS

Ronald Bunker, "A Review of Shaped Hole Turbine Film-Cooling Technology", Journal of Heat Transfer, Apr. 2005, vol. 127, pp. 441-453.

* cited by examiner

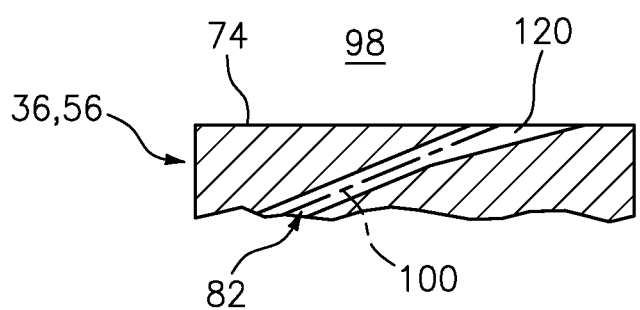 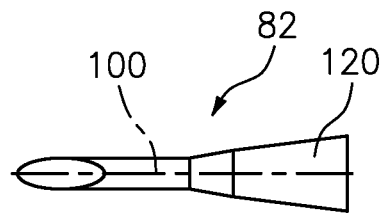
FIG. 14A   FIG. 14B
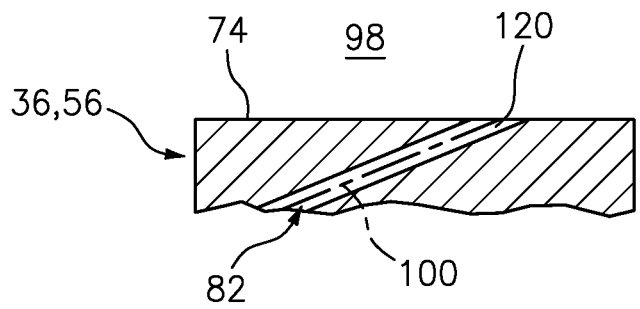 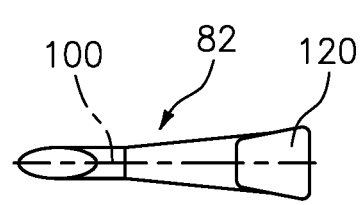
FIG. 15A   FIG. 15B
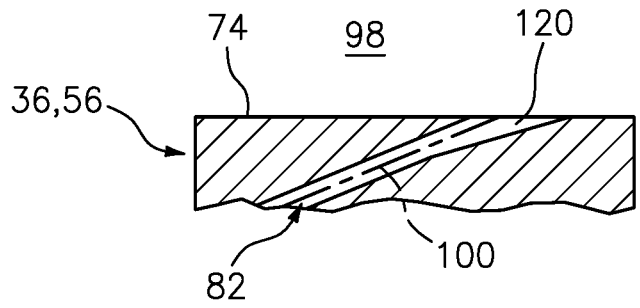 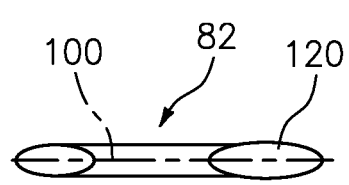
FIG. 16A   FIG. 16B
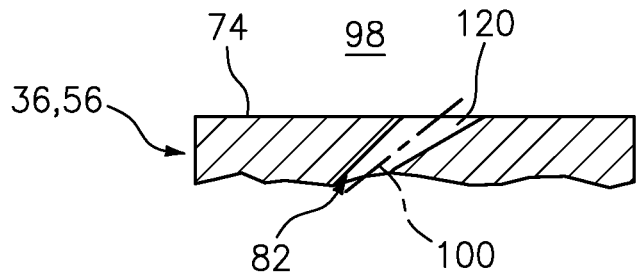 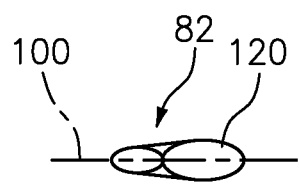
FIG. 17A   FIG. 17B

MULTI-WALLED STRUCTURE FOR A GAS TURBINE ENGINE

BACKGROUND OF THE DISCLOSURE

1. Technical Field

This disclosure relates generally to a gas turbine engine and, more particularly, to a multi-walled structure in the gas turbine engine.

2. Background Information

A gas turbine engine combustor may include a combustor wall with a dual-walled structure. This dual-walled structure typically includes a shell supporting a heat shield (also referred to as a "liner"). The shell may include an array of impingement apertures and the heat shield may include an array of effusion apertures. The impingement apertures are provided to impingement cool a backside of the heat shield. The effusion apertures are also provided to cool the heat shield by facilitating convection within the heat shield (e.g., as cooling air passes through the effusion apertures) as well as film cooling a hot side of the heat shield. Such a dual-wall structure is configured such that a pressure drop across the shell is greater than a pressure drop across the heat shield. While such known dual-walled structures have various benefits, there is still room in the art for improvement. In particular, there is a need in the art for a multi-walled structure with improved cooling characteristics, particularly as combustion gas temperatures within modern gas turbine engine combustors continue to increase more and more. There is also a need in the art for a multi-walled structure which is less susceptible to foreign matter (e.g., dirt, sand, etc.) accumulation on the backside of the heat shield.

SUMMARY OF THE DISCLOSURE

According to an aspect of the present disclosure, an assembly is provided for a gas turbine engine. This assembly includes a multi-walled structure including a cold wall, a hot wall and a cooling cavity vertically between the cold wall and the hot wall. The cold wall includes a plurality of cold wall apertures fluidly coupled with the cooling cavity. The cold wall apertures are configured to subject the cold wall to a cold wall pressure drop vertically across the cold wall. The hot wall includes a plurality of hot wall apertures fluid coupled with the cooling cavity. The hot wall apertures are configured to subject the hot wall to a hot wall pressure drop vertically across the hot wall that is greater than or equal to the cold wall pressure drop.

According to another aspect of the present disclosure, another assembly is provided for a gas turbine engine. This assembly includes a multi-walled structure including a cold wall, a hot wall and a cooling cavity between the cold wall and the hot wall. The cold wall includes a plurality of cold wall apertures fluidly coupled with the cooling cavity. The cold wall apertures provide the cold wall with a first percentage of open area. The hot wall includes a plurality of hot wall apertures fluid coupled with the cooling cavity. The hot wall apertures provide the hot wall with a second percentage of open area that is less than the first percentage of open area.

According to still another aspect of the present disclosure, another assembly is provided for a gas turbine engine. This assembly includes a multi-walled structure including a cold wall, a hot wall and a cooling cavity between and formed by the cold wall and the hot wall. The cold wall includes a plurality of cold wall apertures fluidly coupled with the cooling cavity. The cold wall apertures include a first cold wall aperture that extends through the cold wall along a cold wall aperture centerline that is angularly offset from an interior surface of the cold wall by an acute angle. The hot wall includes a plurality of hot wall apertures fluid coupled with the cooling cavity. The hot wall apertures include a first hot wall aperture that extends through the hot wall along a hot wall aperture centerline with a tortuous trajectory.

A longitudinal length of the first hot wall aperture along the hot wall aperture centerline may be greater than a thickness of the hot wall and/or less than or equal to twenty times the thickness of the hot wall.

At least a portion of the cold wall aperture centerline that extends to an interior surface of the cold wall defining the cooling cavity may have a cold wall aperture centerline trajectory with a component in a first direction and a component in a second direction. At least a portion of the hot wall aperture centerline that extends from an interior surface of the hot wall defining the cooling cavity may have a hot wall aperture centerline trajectory with a component in the first direction and a component in the second direction.

The multi-walled structure may be configured such that the cold wall pressure drop is equal to between five percent and forty-five percent of a total pressure drop vertically across the multi-walled structure.

The multi-walled structure may be configured such that the hot wall pressure drop is equal to between fifty-five percent and ninety five percent of a total pressure drop vertically across the multi-walled structure.

The hot wall pressure drop may be at least one and one-quarter times the cold wall pressure drop.

The cold wall apertures may include an impingement aperture configured to direct a jet of cooling fluid to impinge against the hot wall.

The cold wall apertures may include a first cold wall aperture that extends through the cold wall along a cold wall aperture centerline. The cold wall aperture centerline may be angularly offset from an interior surface of the cold wall by an acute angle.

The hot wall apertures may include an effusion aperture configured to direct cooling fluid out of the cooling cavity into a plenum and along an exterior surface of the hot wall.

The hot wall apertures may include a first hot wall aperture that extends through the hot wall along a hot wall aperture centerline with a tortuous trajectory.

A longitudinal length of the first hot wall aperture along the hot wall aperture centerline may be greater than a thickness of the hot wall.

The cold wall apertures may include a first cold wall aperture that extends through the cold wall along a cold wall aperture centerline. At least a portion of the cold wall aperture centerline that extends to an interior surface of the cold wall defining the cooling cavity may have a trajectory with a component in a first direction and a component in a vertical direction. The hot wall apertures may include a first hot wall aperture that extends through the hot wall along a hot wall aperture centerline. At least a portion of the hot wall aperture centerline that extends from an interior surface of the hot wall defining the cooling cavity may have a trajectory with a component in the first direction and a component in the vertical direction.

The cold wall apertures may include a first cold wall aperture that extends through the cold wall along a cold wall aperture centerline. At least a portion of the cold wall aperture centerline that extends to an interior surface of the cold wall defining the cooling cavity may have a trajectory with a component in a first direction and a component in a vertical direction. The hot wall apertures may include a first hot wall aperture that extends through the hot wall along a hot wall aperture centerline. At least a portion of the hot wall aperture centerline that extends from an interior surface of the hot wall defining the cooling cavity may have a trajectory with a component in a second direction and a component in the vertical direction. The second direction may be different from the first direction.

The hot wall apertures may include a first hot wall aperture with a diffusion outlet portion.

The cold wall apertures may include a first cold wall aperture with a first diameter. The hot wall apertures may include a first hot wall aperture with a second diameter that is less than the first diameter.

The cold wall and/or the cold wall apertures may only include a first quantity of cold wall apertures. The hot wall and/or the hot wall apertures may only include a second quantity of hot wall apertures that is less than the first quantity of cold wall apertures.

The cold wall may be configured with a first percentage of open area to the cooling cavity. The hot wall may be configured with a second percentage of open area from the cooling cavity that is less than the first percentage of open area.

The assembly may also include a combustor of the gas turbine engine. The combustor may include the multi-walled structure.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 14A and 14B illustrate a portion of one of the hot wall apertures with a diffusion outlet portion.

FIGS. 15A and 15B illustrate a portion of one of the hot wall apertures with another diffusion outlet portion.

FIGS. 16A and 16B illustrate a portion of one of the hot wall apertures with another diffusion outlet portion.

FIGS. 17A and 17B illustrate a portion of one of the hot wall apertures with still another diffusion outlet portion.

DETAILED DESCRIPTION

Figure 1:
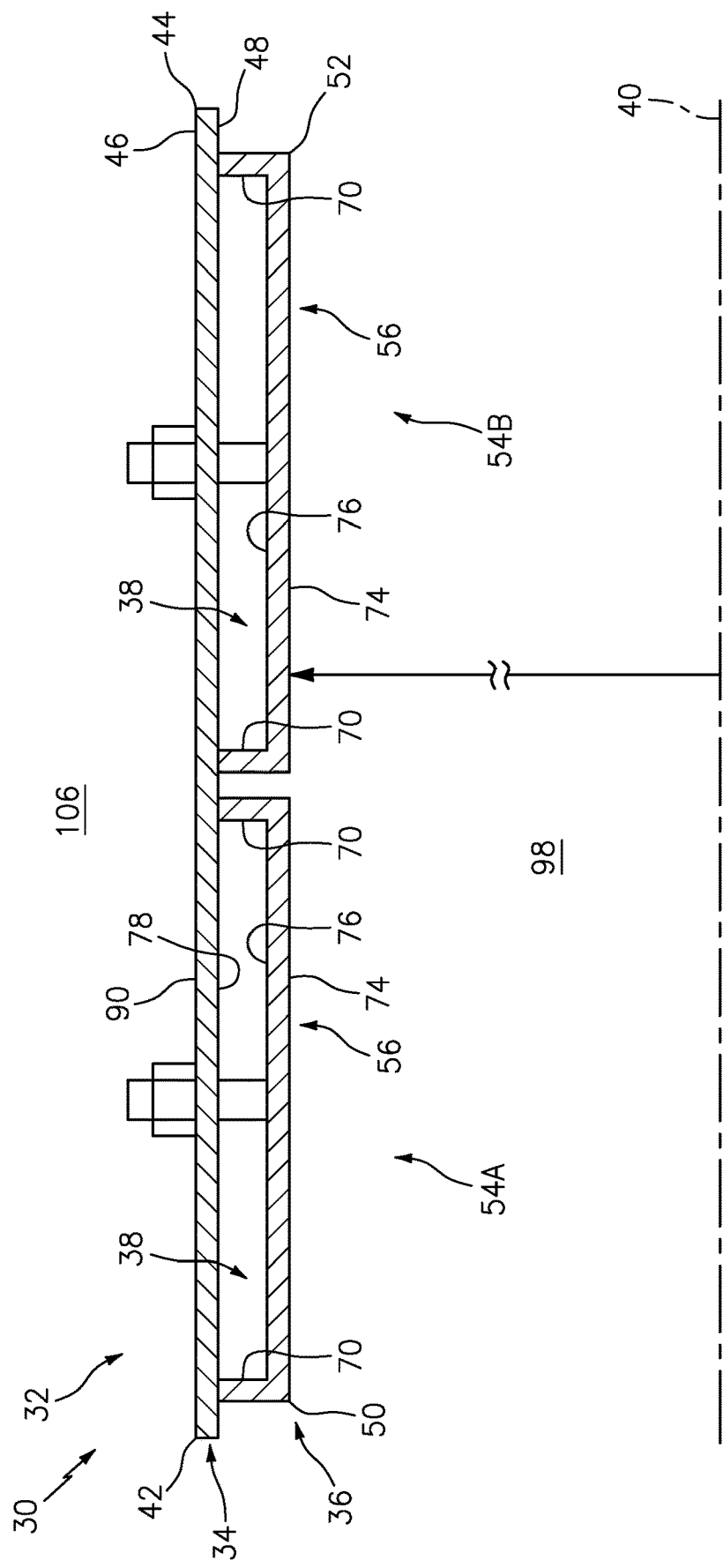
FIG. 1 is a partial side sectional illustration of an assembly with a multi-walled structure.

FIG. 1 illustrates an assembly 30 for a gas turbine engine. This turbine engine assembly 30 includes a multi-walled structure 32 such as, for example, a hollow dual-walled structure. For ease of description, the multi-walled structure 32 is described below as a wall of a combustor of the gas turbine engine. The present disclosure, however, is not limited to such an exemplary combustor application. For example, the multi-walled structure 32 may alternatively be configured as a duct wall, an airfoil wall, a vane wall, a case wall, a platform or any other multi-walled structure (e.g., wall structure with internal cooling) within the gas turbine engine.

The multi-walled structure 32 of FIG. 1 includes a cold wall 34 and a hot wall 36. The multi-walled structure 32 also includes one or more internal cooling cavities 38.

The term "cold wall" may describe herein a wall portion of the multi-walled structure 32 that is subject to relatively low temperatures during operation of the turbine engine assembly 30. For example, where the multi-walled structure 32 is configured as part of a combustor, the cold wall 34 may be configured as an exterior wall (also sometimes referred to as a "shell") of a combustor wall. Alternatively, where the multi-walled structure 32 is configured as an airfoil or a vane, the cold wall 34 may be configured as an interior wall of an airfoil wall or a vane wall.

Figure 2:
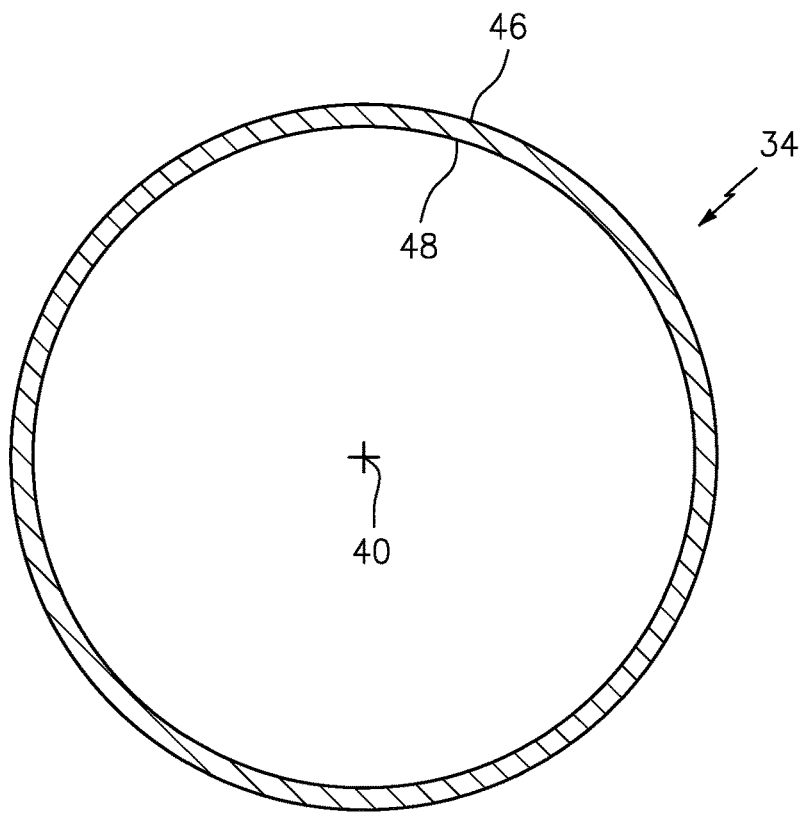
FIG. 2 is a cross-sectional illustration of a cold wall of the multi-walled structure.

The cold wall 34 of FIG. 2 extends circumferentially about (e.g., completely around) an axial centerline 40 of the turbine engine assembly 30; e.g., a rotational axis and/or centerline axis of the gas turbine engine. This cold wall 34 may be configured as a monolithic full hoop body. Alternatively, the cold wall 34 may be configured from one or more segments; e.g., a pair of arcuate halves. Referring to FIG. 1, the cold wall 34 extends longitudinally (e.g., generally axially along the axial centerline 40) between and to a cold wall first (e.g., forward/upstream) end 42 and a cold wall second (e.g., aft/downstream) end 44. The cold wall 34 has a vertical thickness that extends vertically (e.g., generally radially relative to the axial centerline 40) between and to a cold wall exterior side 46 and a cold wall interior side 48.

The cold wall 34 may be constructed from or otherwise include metal. This metal may include, but is not limited to, nickel (Ni), aluminum (Al), titanium (Ti), steel, etc. The present disclosure, however, is not limited to the foregoing exemplary cold wall materials, nor to metal cold walls.

The term "hot wall" describes herein a wall portion of the multi-walled structure 32 that is subject to relatively high temperatures during operation of the turbine engine assembly 30. For example, where the multi-walled structure 32 is configured as part of a combustor, the hot wall 36 may be configured as an interior wall (also sometimes referred to as a "heat shield" or a "liner") of a combustor wall. Alternatively, where the multi-walled structure 32 is configured as an airfoil or a vane, the hot wall 36 may be configured as an exterior wall of an airfoil wall or a vane wall.

Figure 3:
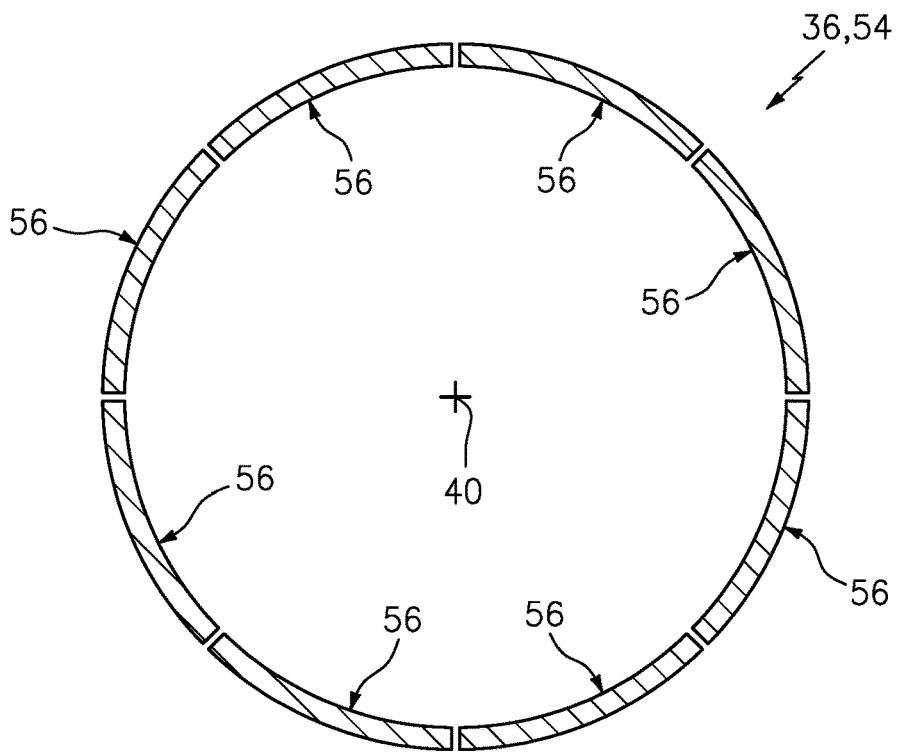
FIG. 3 is a cross-sectional illustration of a hot wall of the multi-walled structure.

The hot wall 36 of FIG. 3 extends circumferentially about (e.g., completely around) the axial centerline 40. Referring to FIG. 1, the hot wall 36 extends longitudinally (e.g., generally axially along the axial centerline 40) between and to a hot wall first (e.g., forward/upstream) end 50 and a hot wall second (e.g., aft/downstream) end 52.

The hot wall 36 of FIG. 1 includes/is formed by one or more arrays 54A and 54B of hot wall panels (generally referred to as "54"). Referring to FIG. 3, each hot wall panel array 54 includes one or more (e.g., arcuate) hot wall panels 56; e.g., hot wall segments. The hot wall panels 56 in each respective array 54 are arranged circumferentially end-to-end so as to provide the hot wall 36 of FIG. 3 with a full hoop segmented body. The hot wall 36 and one, some or each of its hot wall panels 56 may be construct from metal and/or ceramic. The metal may include, but is not limited to, nickel (Ni), aluminum (Al), titanium (Ti), steel, etc. The ceramic may include, but is not limited to, ceramic matrix composite (CMC) material; e.g., SiC/SiC. The present disclosure, however, is not limited to the foregoing exemplary hot wall materials, nor to metal nor ceramic hot walls/panels.

Figure 4:
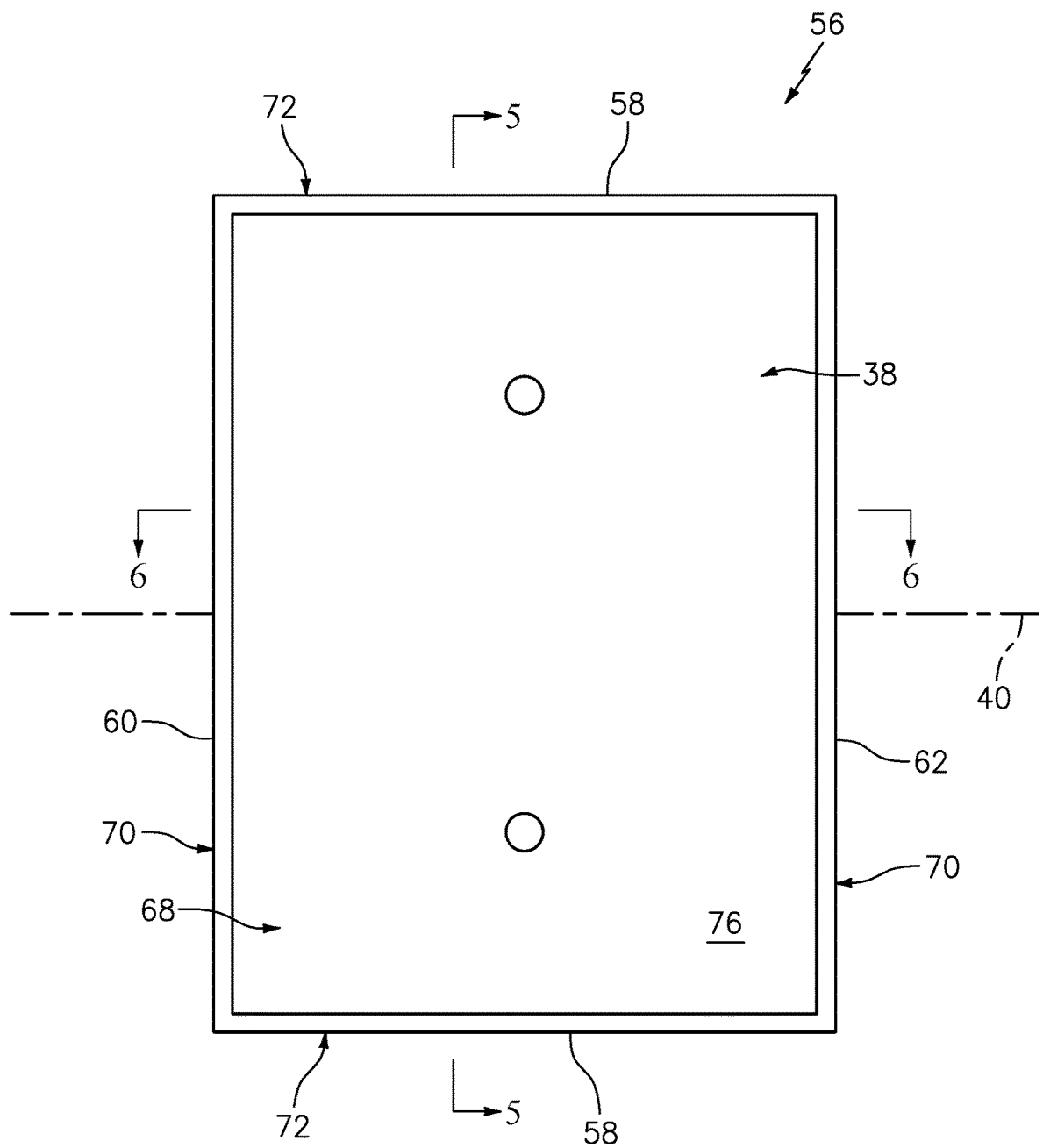
FIG. 4 is a plane view illustration of a panel of the hot wall.
Figure 5:
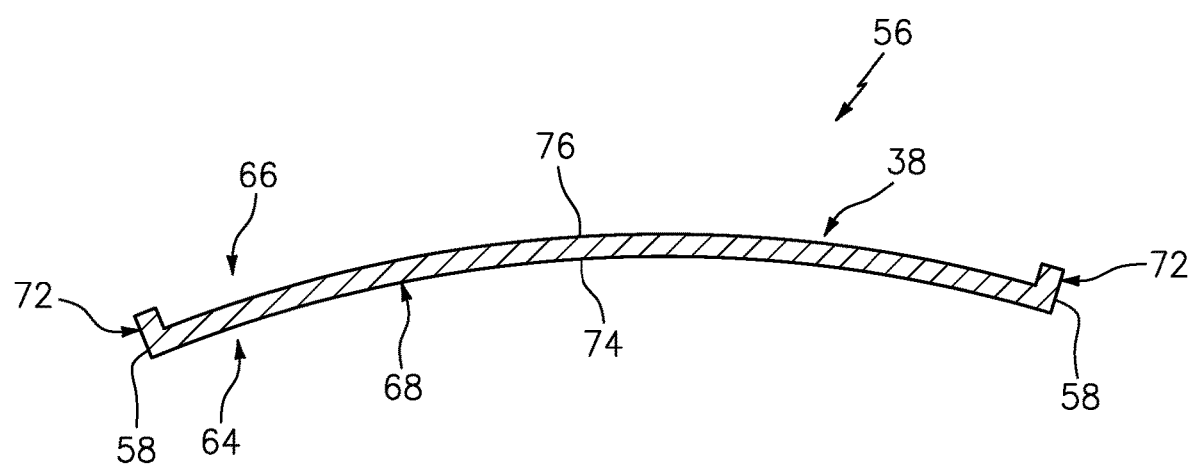
FIG. 5 is a cross-sectional illustration of the hot wall panel taken along line 5-5 in FIG. 4.
Figure 6:
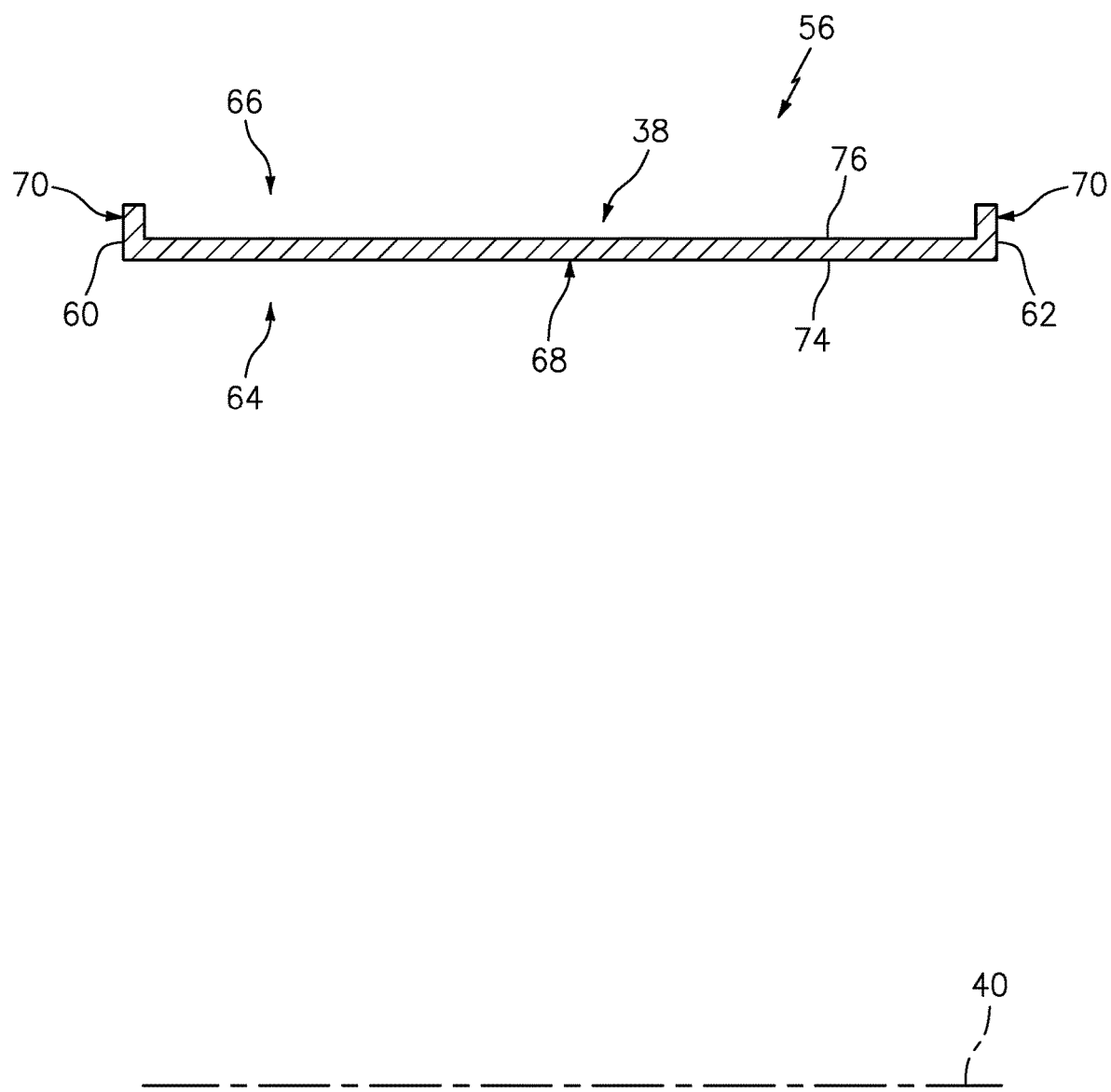
FIG. 6 is a side sectional illustration of the hot wall panel taken along line 6-6 in FIG. 4.

Referring to FIG. 4, each hot wall panel 56 extends laterally (e.g., generally circumferentially about the axial centerline 40) between and to opposing panel sides 58; see also FIG. 5. Each hot wall panel 56 extends longitudinally (e.g., generally axially along the axial centerline 40) between and to a panel first (e.g., forward/upstream) end 60 and a panel second (e.g., aft/downstream) end 62; see also FIG. 6. Referring to FIGS. 5 and 6, each hot wall panel 56 extends vertically (e.g., generally radially relative to the axial centerline 40) between and to a panel exterior side 64 (e.g., hot side) and a panel interior side 66 (e.g., cold side).

Each hot wall panel 56 of FIGS. 4-6 includes a panel base 68 and one or more panel rails. The panel rails of FIGS. 4-6 include one or more lateral rails 70 (e.g., end rails) and one or more longitudinal rails 72 (e.g., side rails).

The panel base 68 extends laterally between and to the opposing panel sides 58. The panel base 68 extends longitudinally between and to the panel first end 60 and the panel second end 62. The panel base 68 extends vertically from an exterior hot wall panel surface 74 (e.g., a hot side surface/hot wall exterior surface) on the panel exterior side 64 to an interior hot wall panel surface 76 (e.g., a cold side surface/hot wall interior surface) towards the panel interior side 66. The panel base 68 of FIG. 5 is configured with a curved (e.g., arcuate, partially circular, etc.) sectional geometry when viewed, for example, in a plane perpendicular to the axial centerline 40; e.g., the plane of FIG. 5. The panel base 68 of FIG. 6 is configured with a straight, linear sectional geometry when viewed, for example, in a plane parallel with the axial centerline 40; e.g., the plane of FIG. 6. The present disclosure, however, is not limited to such exemplary panel base sectional geometries.

The hot wall exterior surface 74 of FIG. 5 extends laterally between and to the opposing panel sides 58. The hot wall exterior surface 74 of FIG. 6 extends longitudinally between and to the panel first end 60 and the panel second end 62.

The hot wall interior surface 76 of FIG. 4 extends laterally between and to the longitudinal rails 72. The hot wall interior surface 76 extends longitudinally between and to the lateral rails 70.

The rails 70 and 72 of FIG. 4 are configured to collectively form a perimeter rail (e.g., completely) around the hot wall panel 56 and its hot wall interior surface 76. Each lateral rail 70 of FIG. 4, for example, is located at (e.g., on, adjacent or proximate) a respective panel end 60, 62. Each lateral rail 70 extends laterally along the panel base 68 between and is connected to the longitudinal rails 72. Each longitudinal rail 72 of FIG. 4 is located at (e.g., on, adjacent or proximate) a respective panel side 58. Each longitudinal rail 72 extends longitudinally along the panel base 68 between and is connected to the lateral rails 70. Each of the rails 70, 72 is connected to the panel base 68 and projects vertically out from the panel base 68 to a distal end configured to sealingly engage (e.g., contact) an interior surface 78 of the cold wall 34 as shown in FIG. 1.

Each cooling cavity 38 of FIG. 1 is formed within the multi-walled structure 32 vertically between and by the cold wall 34 and the hot wall 36. In particular, each cooling cavity 38 extends vertically between and to the cold wall interior surface 78 and a respective one of the hot wall panels 56 and its hot wall interior surface 76. Each cooling cavity 38 of FIG. 1 extends longitudinally between and to the lateral rails 70 of a respective one of the hot wall panels 56. Each cooling cavity 38 of FIG. 4 extends laterally between and to the longitudinal rails 72 of a respective one of the hot wall panels 56.

Referring to FIG. 7, each cooling cavity 38 is fluidly coupled with one or more respective apertures 80 in the cold wall 34 and one or more respective apertures 82 in the hot wall 36. The cooling cavity 38 thereby (e.g., directly) fluidly couples the respective cold wall apertures 80 with the respective hot wall apertures 82.

Figure 8:
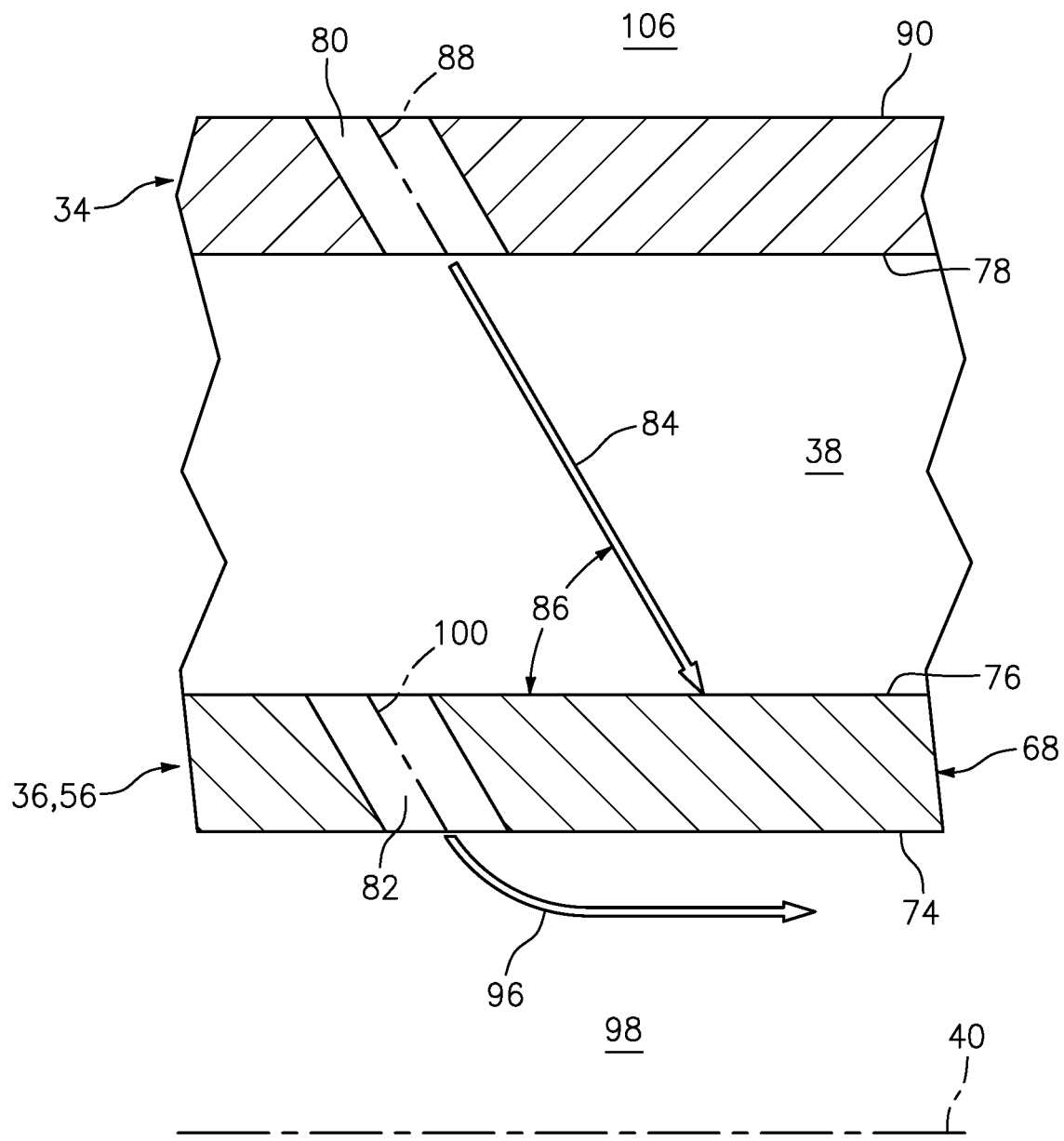
FIG. 8 is a side sectional illustration of a portion of the multi-walled structure depicting cooling fluid flow through one of the cold wall apertures and one of the hot wall apertures.

Referring to FIG. 8, one, some or each of the cold wall apertures 80 is configured as an impingement aperture. For example, each cold wall aperture 80 of FIG. 8 is configured to direct a jet 84 of cooling fluid (e.g., gas) through the respective cooling cavity 38 and against a respective one of the hot wall panels 56 and its hot wall interior surface 76.

Under certain operating conditions, some cooling fluids (e.g., compressed air) may include foreign matter particles such as, but not limited to, sand and/or dirt. To prevent and/or reduce accumulation of foreign matter deposits on the hot wall interior surface 76, one, some or each of the cold wall apertures 80 may be angled such that the cooling fluid jet 84 impinges against the hot wall interior surface 76 at a non-ninety degree angle 86; e.g., an acute angle. With such an angled trajectory, foreign matter carried by a respective cooling fluid jet 84 strikes the hot wall interior surface 76 with a smaller vertical force. The foreign matter may thereby be less likely to stick to the hot wall interior surface 76 upon impact.

Figure 7A:
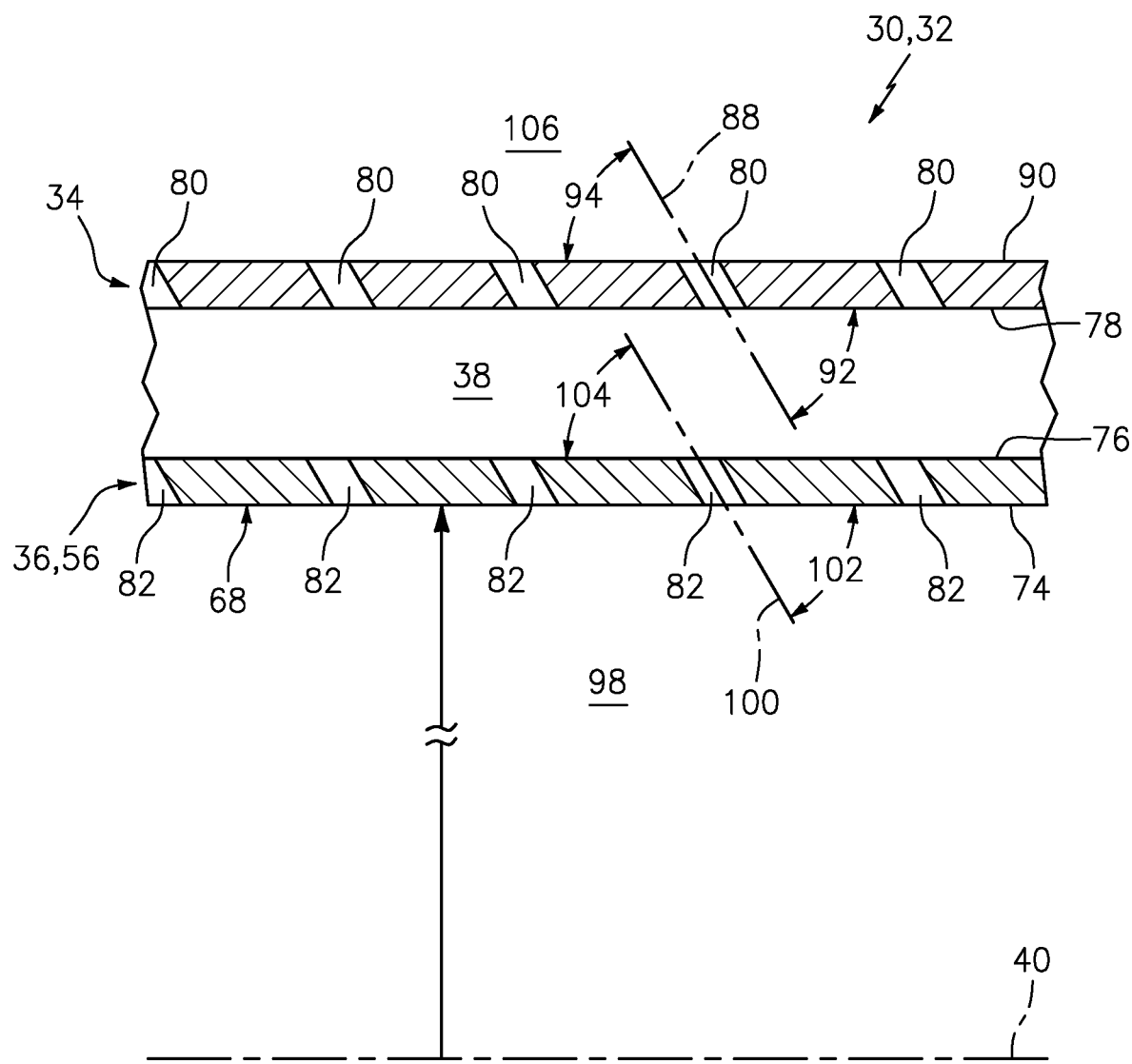
FIG. 7A is a side sectional illustration of a portion of the multi-walled structure shown in more detail with cold wall apertures and hot wall apertures.
Figure 7B:
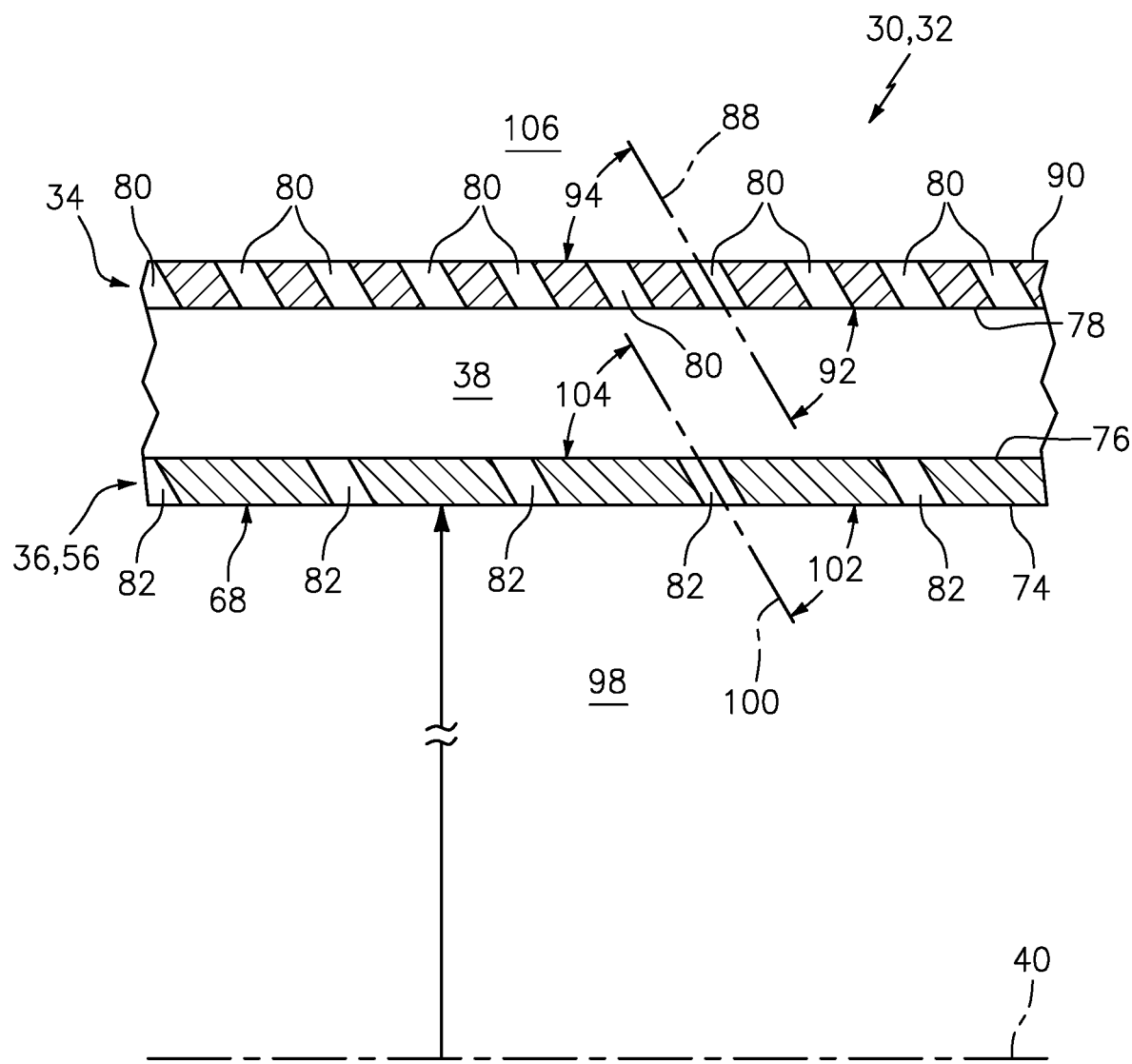
FIG. 7B is a side sectional illustration of a portion of the multi-walled structure with another arrangement of apertures.
Figure 7C:
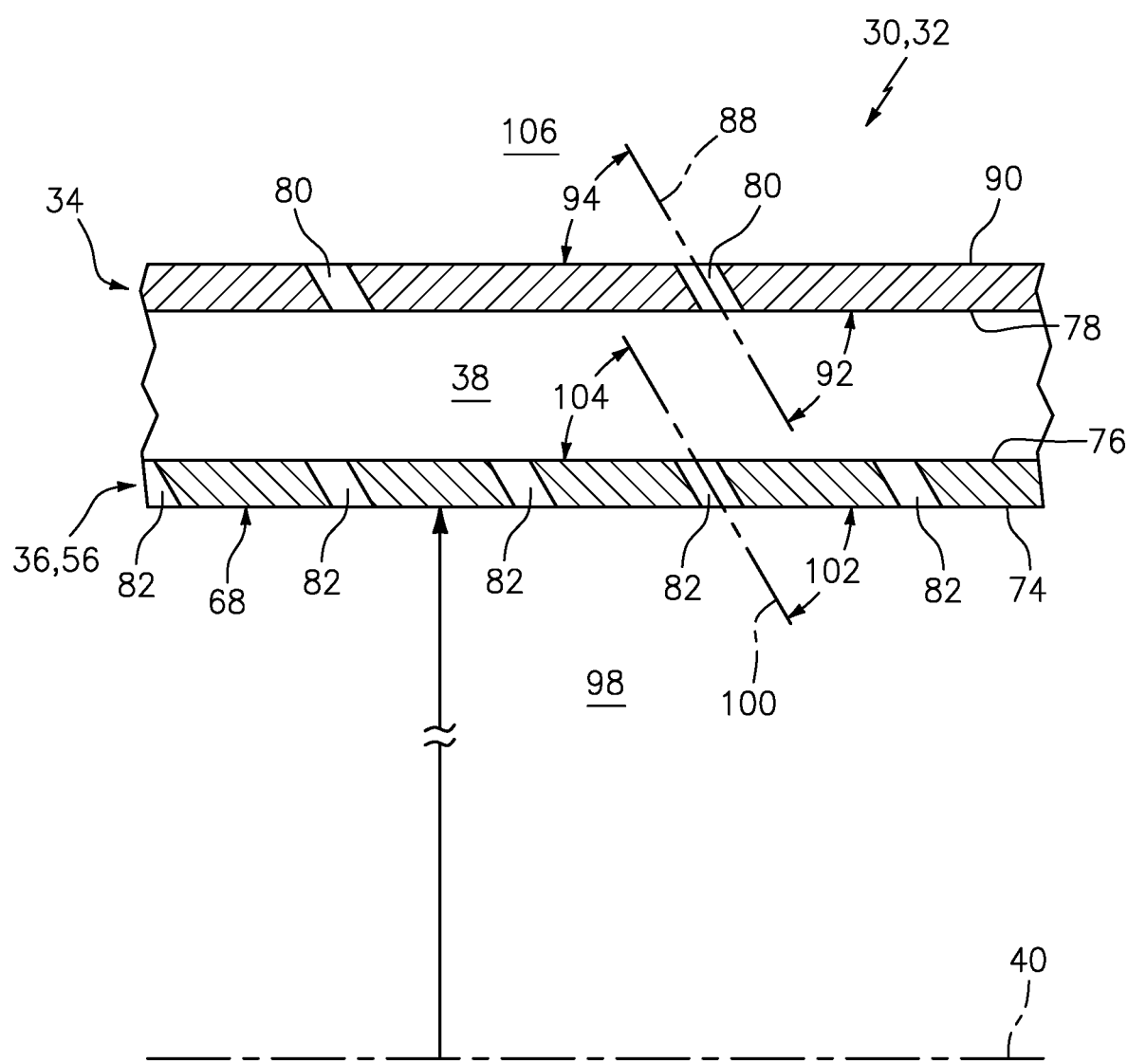
FIG. 7C is a side sectional illustration of a portion of the multi-walled structure with still another arrangement of apertures.

Each cold wall aperture 80 extends along a respective cold wall aperture centerline 88 (e.g., a centerline axis) through the cold wall 34 from an exterior surface 90 of the cold wall 34 to the cold wall interior surface 78. The cold wall aperture centerline 88 may be a straight, linear centerline; however, the present disclosure is not limited thereto. The cold wall aperture centerline 88 of FIG. 7A is angularly offset from one or more of the surfaces 78 and 90 by an included angle 92, 94; e.g., an acute angle. However, in other embodiments, the centerline 88 of one, some or each of the cold wall apertures 80 may be arranged perpendicular to one or more of the surfaces 78 and 90.

One, some or each of the hot wall apertures 82 is configured as an effusion aperture. For example, each hot wall aperture 82 of FIG. 8 is configured to direct a jet/flow 96 of cooling fluid (e.g., gas) out of the multi-walled structure 32 and into a plenum 98 (e.g., a combustion chamber) adjacent and/or formed partially by the hot wall exterior surface 74. Once within the plenum 98, the cooling fluid 96 exhausted from the respective hot wall aperture 82 may be pushed against and/or towards the hot wall exterior surface 74 by fluid (e.g., combustion gases) within the plenum 98 and form a protective barrier (e.g., film) against/along a downstream portion of the hot wall exterior surface 74.

Each hot wall aperture 82 extends along a respective hot wall aperture centerline 100 through the hot wall 36 from the respective hot wall interior surface 76 to the respective hot wall exterior surface 74. The hot wall aperture centerline 100 may be a straight, linear centerline; however, the present disclosure is not limited thereto as described below in further detail. The hot wall aperture centerline 100 of FIG. 7A is angularly offset from one or more of the surfaces 74 and 76 by an included angle 102, 104; e.g., an acute angle. The present disclosure, however, is not limited to such an exemplary hot wall aperture configuration.

As the cooling fluid flows sequentially through the cold wall apertures 80, the cooling cavities 38 and the hot wall apertures 82, the multi-walled structure 32 is subject to a total pressure drop vertically thereacross. This total pressure drop may be measured/quantified by subtracting pressure of the cooling fluid exhausted form the hot wall apertures 82 from pressure of the cooling fluid flowing into the cold wall apertures 80; e.g., the pressure of the cooling fluid within a plenum 106 adjacent and/or formed partially by the cold wall exterior surface 90. Similarly, the cold wall 34 is subject to a cold wall pressure drop vertically thereacross and the hot wall 36 is subject to a hot wall pressure drop vertically thereacross.

The multi-walled structure 32 may be configured such that hot wall pressure drop is greater than (or equal to) the cold wall pressure drop. For example, the hot wall pressure drop may be greater than at least one and one-quarter times (1.25×) the cold wall pressure drop. The hot wall pressure drop, for example, may be between one and one-half times (1.5×) and nine times (9×) the cold wall pressure drop. More particularly, the hot wall pressure drop may be between two times (2×) and four times (4×) the cold wall pressure drop. Such a configuration may enable the cooling fluid to travel faster through the hot wall apertures 82 than the cold wall apertures 80 and, for example, thereby increase convection within the apertures 82. Such a configuration may also or alternatively enable provision of more complex hot wall aperture 82 configurations as discussed below in further detail.

The cold wall pressure drop may be equal to or less than fifty percent (50%) of the total pressure drop vertically across the multi-walled structure 32; e.g., equal to or less than forty-five percent (45%) of the total pressure drop vertically across the multi-walled structure 32. For example, the cold wall pressure drop may be equal to between five percent (5%) and forty-five percent (45%) of the total pressure drop vertically across the multi-walled structure 32. More particularly, the cold wall pressure drop may be equal to between ten percent (10%) and forty percent (40%) of the total pressure drop vertically across the multi-walled structure 32. Still more particularly, the cold wall pressure drop may be equal to between twenty percent (20%) and thirty percent (30%) of the total pressure drop vertically across the multi-walled structure 32.

The hot wall pressure drop may be equal to or greater than fifty percent (50%) of the total pressure drop vertically across the multi-walled structure 32; e.g., equal to or greater than fifty-five percent (55%) of the total pressure drop vertically across the multi-walled structure 32. For example, the hot wall pressure drop may be equal to between fifty-five percent (55%) and ninety-five percent (95%) of the total pressure drop vertically across the multi-walled structure 32. More particularly, the hot wall pressure drop may be equal to between sixty percent (60%) and ninety percent (90%) of the total pressure drop vertically across the multi-walled structure 32. Still more particularly, the hot wall pressure drop may be equal to between seventy percent (70%) and eighty percent (80%) of the total pressure drop vertically across the multi-walled structure 32. The present disclosure, however, is not limited to the foregoing exemplary total, cold wall and/or hot wall pressure drops.

As discussed briefly above, configuring the multi-walled structure 32 such that the hot wall pressure drop is greater than the cold wall pressure drop enables the hot wall 36 and one, some or each of its panels 56 to be configured with relatively complex hot wall apertures 82. For example, referring to FIGS. 9A and 9B, each hot wall aperture 82 has a tortuous (e.g., non-linear, curved, compound, serpentine, etc.) configuration. More particular, the hot wall aperture centerline 100 of FIGS. 9A and 9B follows a tortuous trajectory through the hot wall 36 and its panel 56. With such a tortuous configuration, a longitudinal length 107 (see FIG. 9B) of each hot wall aperture 82 along its centerline 100 between the surfaces 74 and 76 (see FIG. 9A) may be greater than a vertical thickness 108 of the hot wall 36 and its panel 56 between the surfaces 74 and 76. For example, the longitudinal length 107 may be at least two times (2×), three times (3×), four times (4×), five times (5×) or more of the vertical thickness 108. The longitudinal length 107, for example, may be between two times (2×) and twenty times (20×) the vertical thickness 108. Providing the respective hot wall aperture 82 with its extended longitudinal length 107 (as compared to the vertical thickness 108) increases time the cooling fluid is within the hot wall 36 as well as increases surface area to which the cooling fluid is exposed. Thus, providing the hot wall apertures 82 with tortuous configurations may increase cooling of the hot wall 36. Hot wall cooling may thereby be less dependent upon impingement cooling (see FIG. 8) and, thus, less impacted by accumulation of foreign matter on the hot wall interior surfaces 76.

Figure 9A:
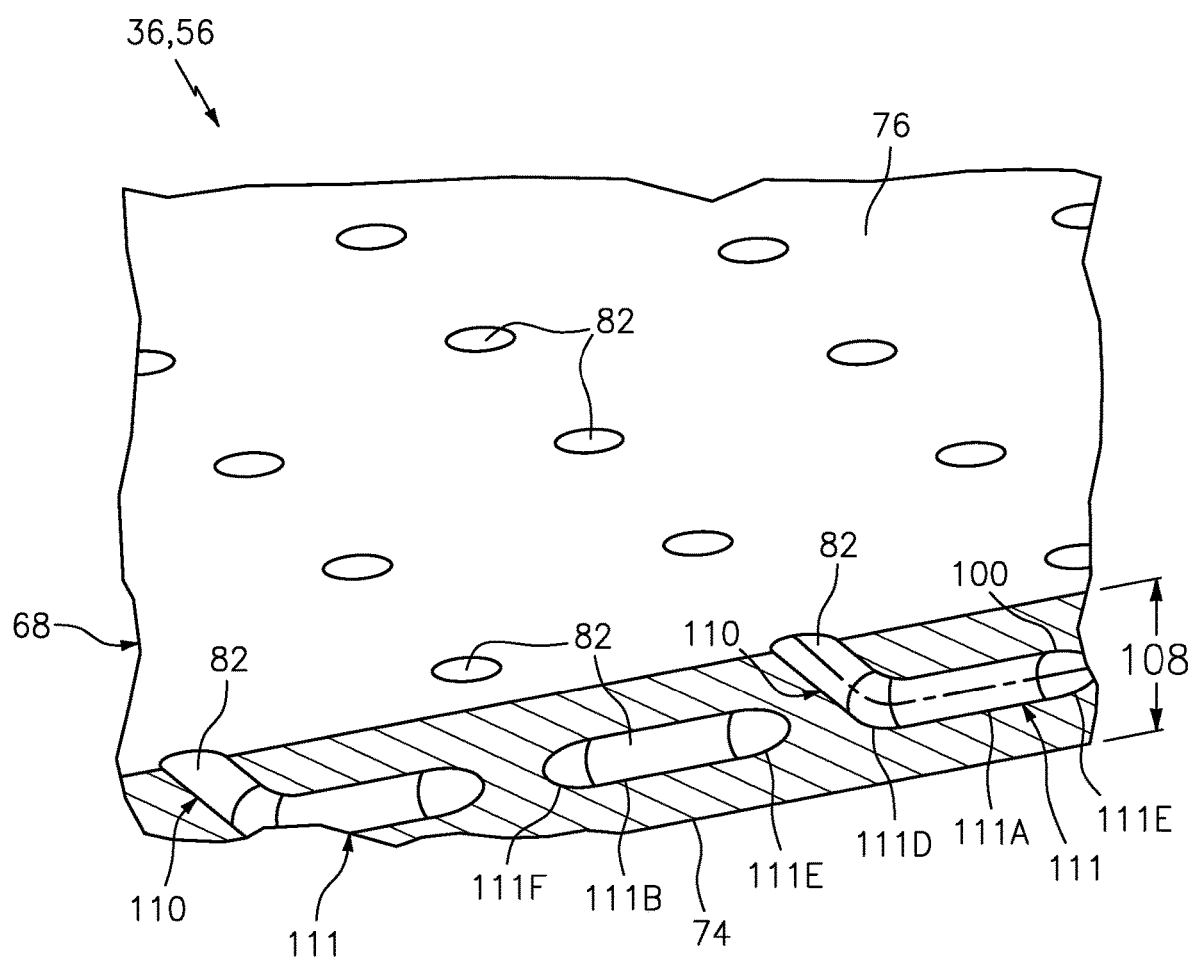
FIG. 9A is a perspective side sectional illustration of a portion of the hot wall configured with tortuous hot wall apertures.
Figure 9B:
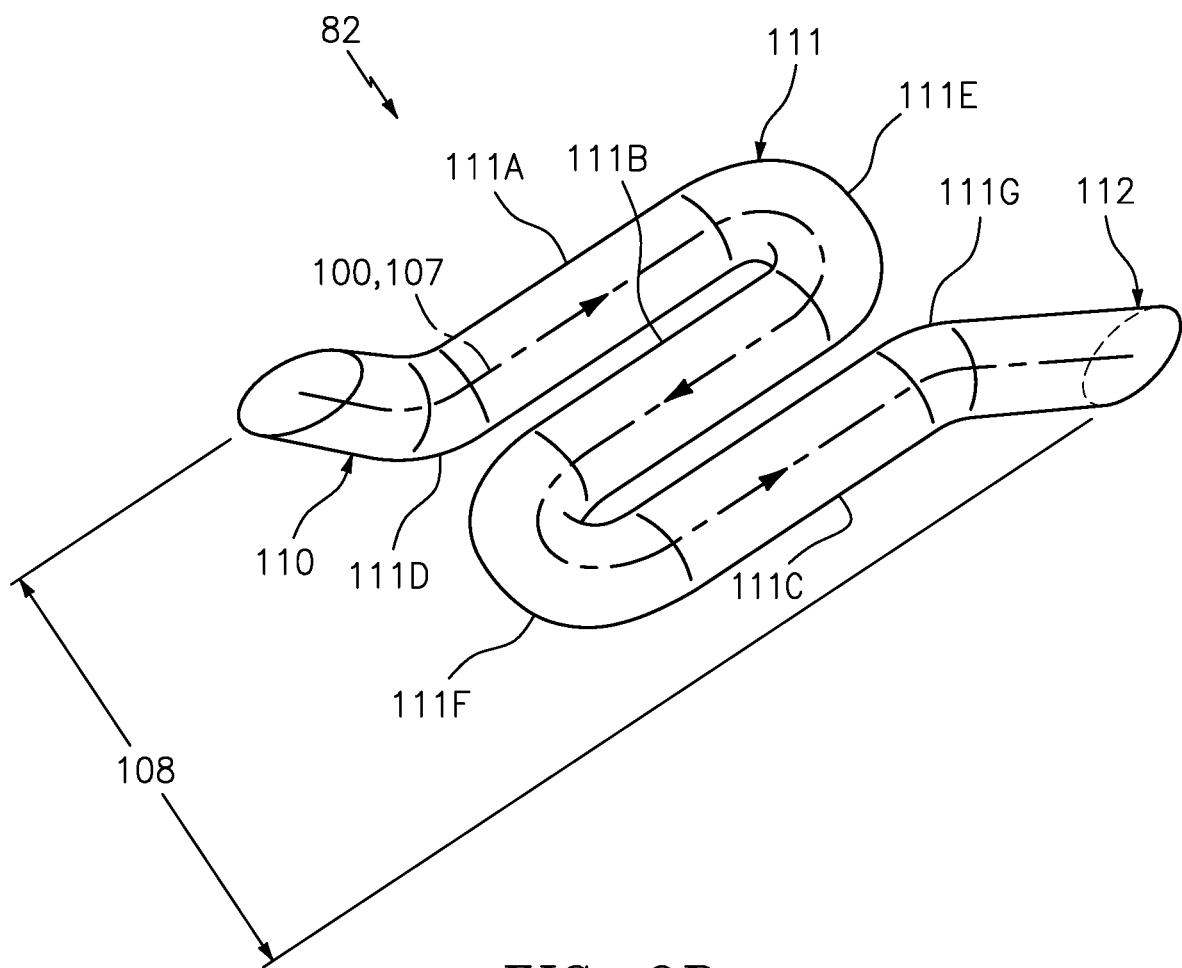
FIG. 9B is a perspective illustration depicting a tubular surface that forms an exemplary one of the tortuous hot wall apertures in FIG. 9A.

Each hot wall aperture 82 of FIGS. 9A and 9B includes an inlet segment 110, a serpentine intermediate segment 111 and an outlet segment 112. The inlet segment 110 extends into the hot wall 36 and its respective panel 56 from the respective hot wall interior surface 76. The inlet segment 110 of FIG. 9B has a straight, linear configuration where the centerline 100 along this inlet segment 110 is angularly offset from the interior surface 76 by an included angle (e.g., 104 in FIG. 7A); e.g., an acute angle. The intermediate segment 111 may generally lie in a plane that is substantially parallel to one or more of the surfaces 74 and 76. This intermediate segment 111 includes one or more major (e.g., straight, linear) sections 111A-C and one or more connection (e.g., curved, elbow) sections 111D-111G which interconnect the major sections 111A-C together and to the inlet segment 110 and the outlet segment 112. The outlet segment 112 extends into the hot wall 36 and its respective panel 56 from the respective hot wall exterior surface 74. The outlet segment 112 of FIG. 9B has a straight, linear configuration where the centerline 100 along this outlet segment 112 is angularly offset from the exterior surface 74 by an included angle (e.g., 102 in FIG. 7A); e.g., an acute angle. Furthermore, the outlet segment 112 may extend to the exterior surface 74 in a common (e.g., lateral and/or longitudinal) direction as the inlet segment 110 extends from the interior surface 76. The present disclosure is not limited, however, to such an exemplary tortuous hot wall aperture configuration. Another example of a suitable hot wall aperture configuration is disclosed in U.S. Publication No. 2016/0230993, which is hereby incorporated herein by reference in its entirety.

Figure 10:
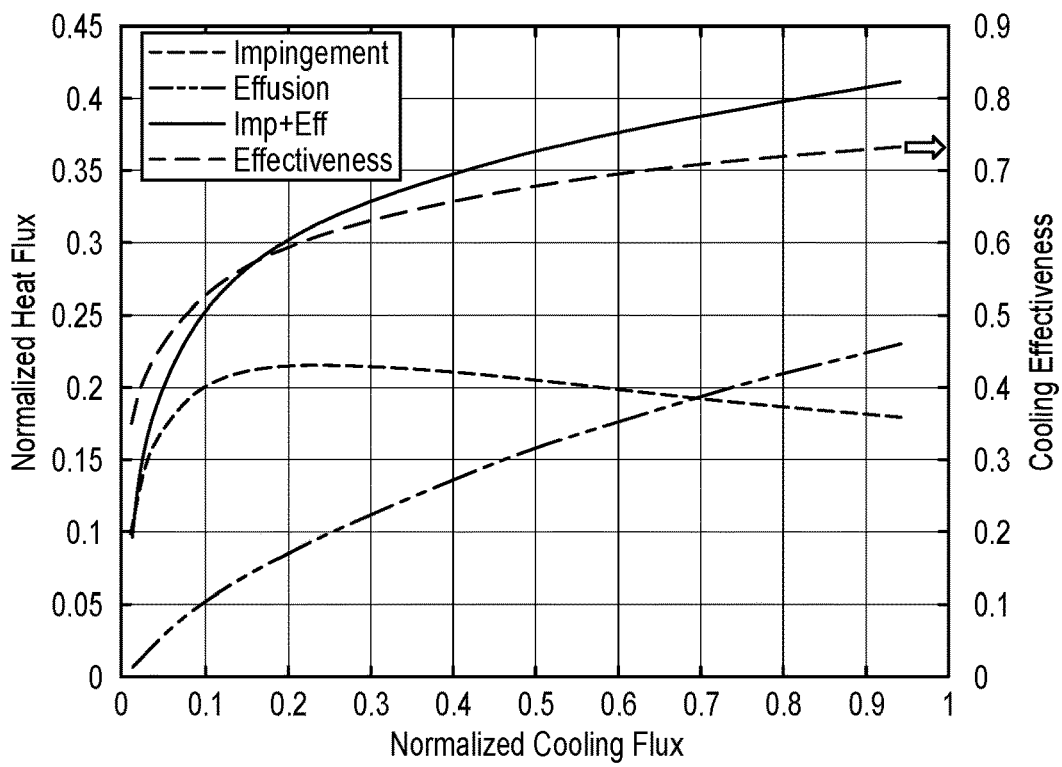
FIG. 10 is a graph illustrating characteristics of a dual-walled structure with (a) straight-line effusions holes and (b) a higher cold panel pressure drop than hot panel pressure drop.
Figure 11:
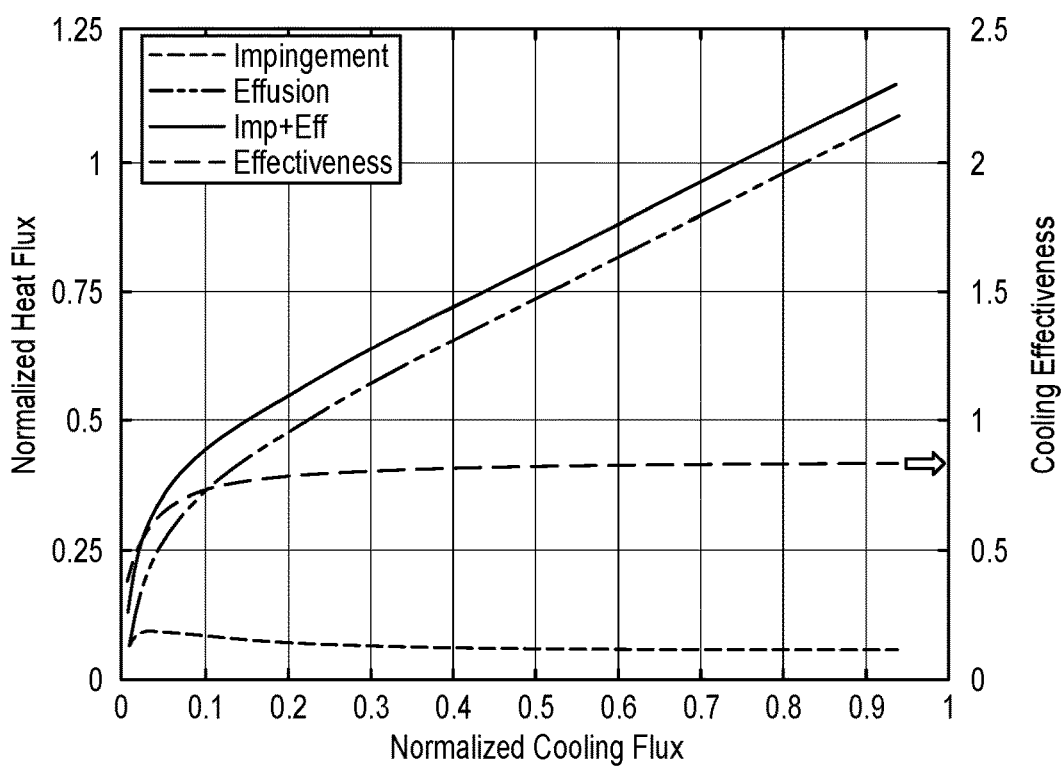
FIG. 11 is a graph illustrating characteristics of the multi-walled structure of FIG. 1 with (a) the hot wall apertures of FIGS. 9A and 9B and (b) a lower cold panel pressure drop than hot panel pressure drop.

FIG. 10 is a graph illustrating characteristics of a dual-walled structure with (a) straight-line impingement and effusions holes and (b) a higher cold panel pressure drop than hot panel pressure drop. FIG. 11 is graph illustrating characteristics of the multi-walled structure 32 described above along with the hot wall aperture 82 configuration of FIGS. 9A and 9B. Notably, overall cooling effectiveness of the hot wall 36 is significantly higher in FIG. 11 than in FIG. 10. As a result, the number of the hot wall apertures 82 in the hot wall 36 may also be reduced to reduce the hole density in the surface 74. By reducing hole density in the hot wall exterior surfaces 74, a coating on that surface 74 (e.g., a thermal barrier coating) may be less susceptible to spallation.

Figure 13:
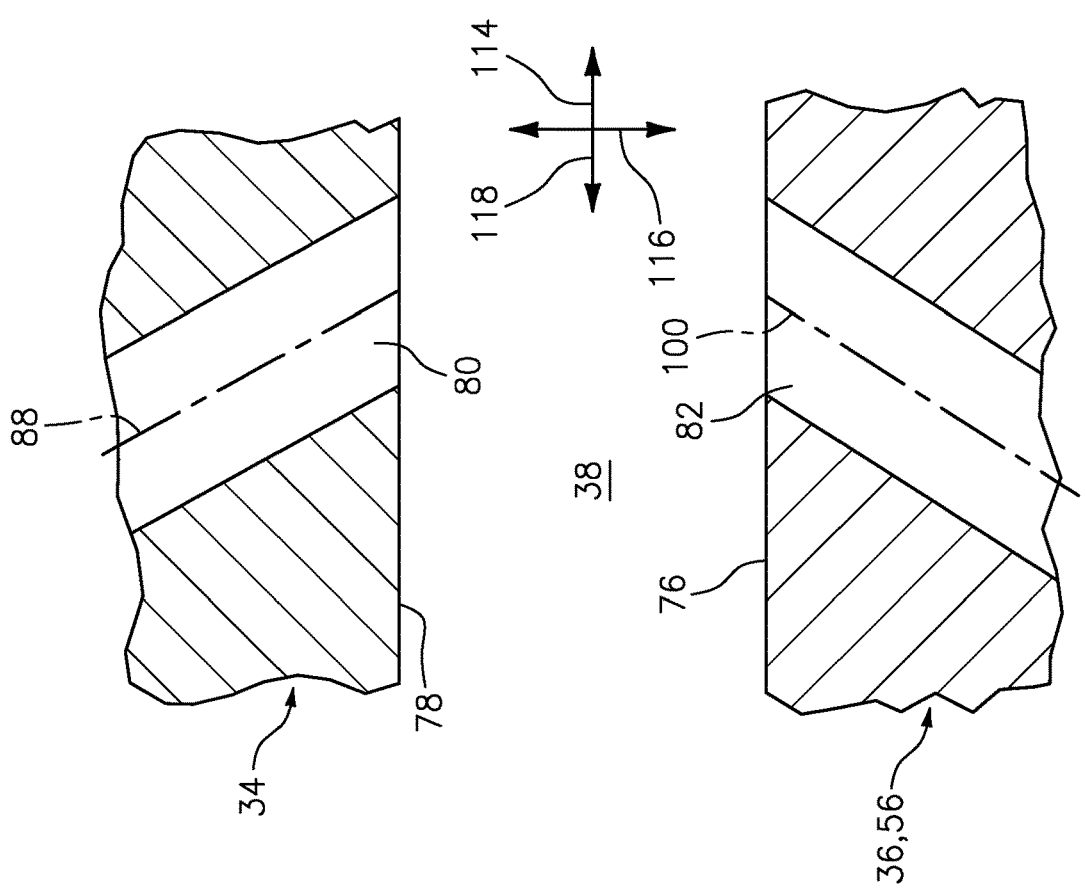
FIG. 13 is a side sectional illustration of a portion of the multi-walled structure configured with unique trajectory cold and hot wall apertures.
Figure 12:
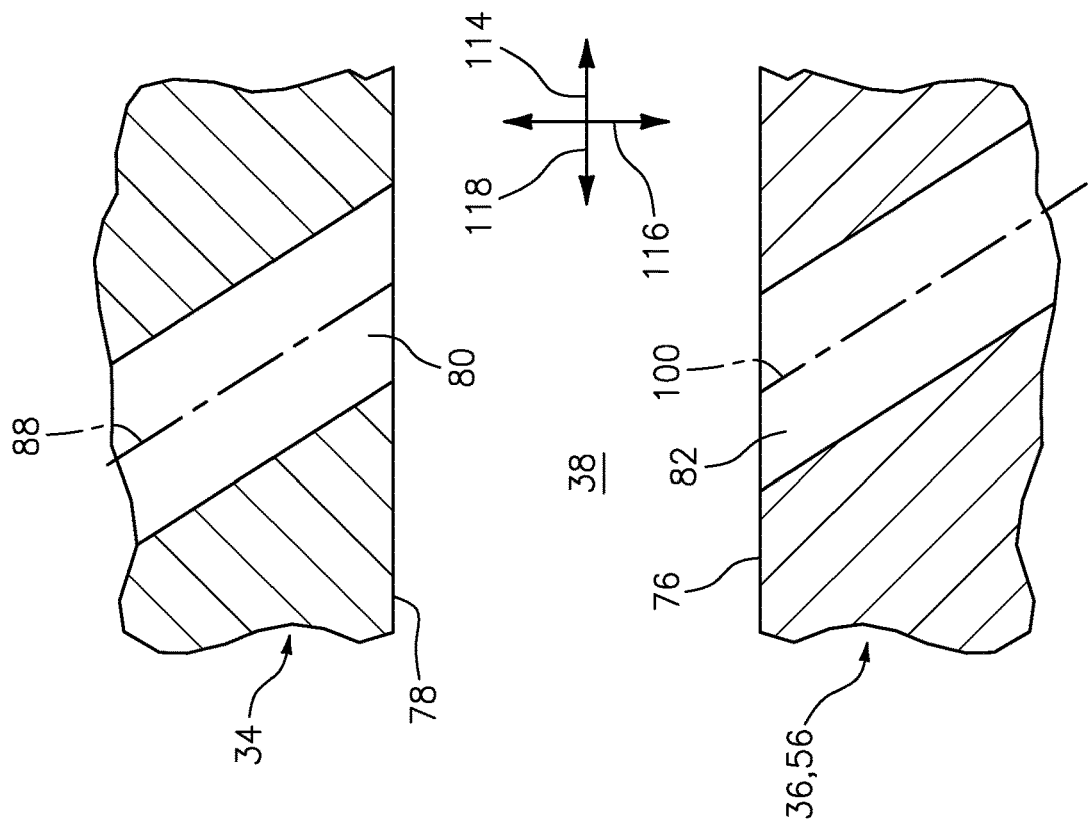
FIG. 12 is a side sectional illustration of a portion of the multi-walled structure configured with common trajectory cold and hot wall apertures.

In some embodiments, referring to FIG. 12, at least a portion (or an entirety of) a respective cold wall aperture centerline 88 that extends to the cold wall interior surface 78 has a trajectory with a component in a first (e.g., longitudinal and/or lateral; left-to-right in FIG. 12) direction 114 and another component in a vertical (e.g., downward in FIG. 12) direction 116. Similarly, at least a portion (or an entirety of) a respective hot wall aperture centerline 100 that extends from the hot wall interior surface 76 has a trajectory with a component in the first direction 114 and another component in the vertical direction 116. Thus, at least an outlet portion of the respective cold wall aperture 80 extends in a similar or same direction as at least an inlet portion of the respective hot wall aperture 82. The present disclosure, however, is not limited to such an exemplary embodiment. For example, in the embodiment of FIG. 13, the trajectory of the hot wall aperture centerline 100 may have a component in a second (e.g., longitudinal and/or lateral; right-to-left in FIG. 13) direction 118 that is different than (e.g., opposite to, perpendicular to, angularly offset from, etc.) the first direction 114.

In some embodiments, referring to FIGS. 14A-17B, one, some or each of the hot wall apertures 82 is configured with a diffusion outlet portion 120 at (e.g., on, adjacent or proximate) the respective hot wall exterior surface 74. This diffusion outlet portion 120 is configured to diffuse the cooling fluid being exhausted from the respective hot wall aperture 82. The present disclosure, of course, is not limited to the exemplary diffusion outlet portion configurations illustrated in FIGS. 14A-17B.

Figure 18:
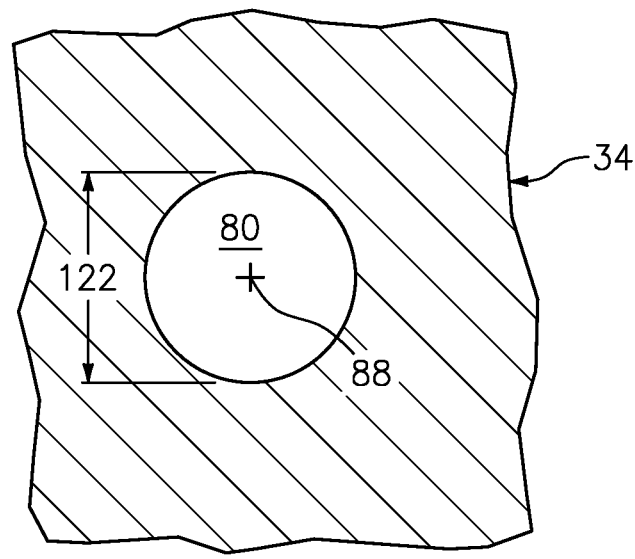
FIG. 18 is a sectional illustration of a portion of the cold wall and one of its apertures.
Figure 19:
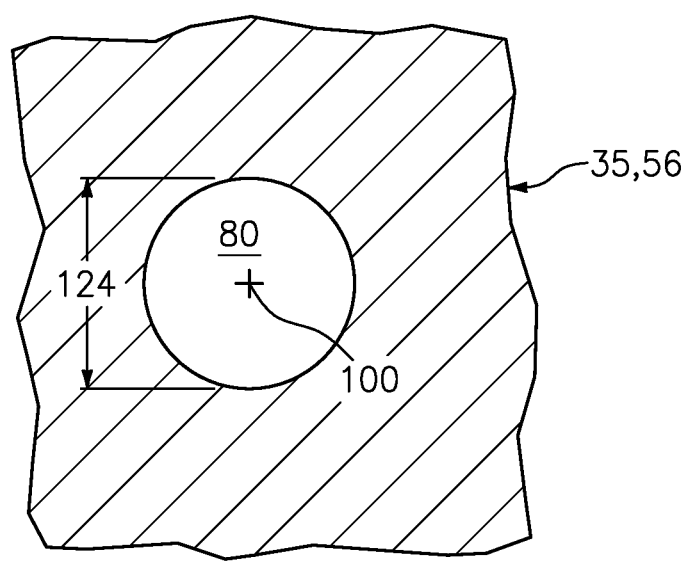
FIG. 19 is a sectional illustration of a portion of the hot wall and one of its apertures.

Referring to FIG. 18, each cold wall aperture 80 has a cold wall aperture width 122 (e.g., diameter) measured in a plane perpendicular to its cold wall aperture centerline 88. Referring to FIG. 19, each hot wall aperture 82 has a hot wall aperture width 124 (e.g., diameter) measured in a plane perpendicular to its hot wall aperture centerline 100. The hot wall aperture width 124 (e.g., at the respective hot wall interior surface 76) may be equal to or different (e.g., greater or less) that the cold wall aperture width 122 (e.g., at the cold wall exterior surface 90).

Referring to FIG. 7A, the cold wall 34 includes (e.g., only has) a first quantity of the cold wall apertures 80 fluidly coupled with a respective cooling cavity 38. The hot wall 36 and a respective panel 56 includes (e.g., only has) a second quantity of the hot wall apertures 82 fluidly coupled with the respective cooling cavity 38. The second quantity may be equal to or different (e.g., greater or less) than the first quantity.

The cold wall apertures 80 provide the cold wall 34 with a cold wall percentage of open area (POA) to a respective one of the cooling cavities 38. The hot wall apertures 82 provide the hot wall 36 and its respective panel 56 with a hot wall percentage of open area (POA) to the respective one of the cooling cavities 38. The term "percentage of open area" may describe a percentage of a surface area of an element (e.g., the surface 90, 76) that is occupied by open area (e.g., voids from the apertures 80, 82). The cold wall percentage of open area may be equal to or different (e.g., greater (see FIG. 7B) or less (see FIG. 7C)) than the hot wall percentage of open area. By tailoring the percentages of open area, the relative quantities of the apertures 80 and 82, the apertures widths 122 and 124, aperture density, aperture 80, 82 configuration and/or various other parameters, the hot side pressure drop can be sized larger than the cold side pressure drop as described above. In addition or alternatively, by configuring the cold wall percentage of open area to be relatively large (e.g., via a relatively high density/large number of the apertures 80 per unit of area as shown, for example, in FIG. 7B), the apertures 80 may protect the hot wall 36 where, for example, one or more of its apertures 82 become clogged and/or a portion of the hot wall 36 is burnt during service.

While each hot wall panel 56 is described above as being associated with a single one of the cooling cavities 38, the present disclosure is not limited to such an exemplary configuration. For example, in other embodiments, one, some or each of the hot wall panels 56 may also include at least one additional internal rail (e.g., see panel 56A in FIG. 20) that sub-divides a cooling cavity into multiple cooling cavities 38. Furthermore, while the multi-walled structure 32 is described above with its hot wall panels 56 as separately formed bodies from the cold wall 34, in other embodiments the hot wall 36 and the cold wall 34 may be formed together as a single monolithic body.

Figure 20:
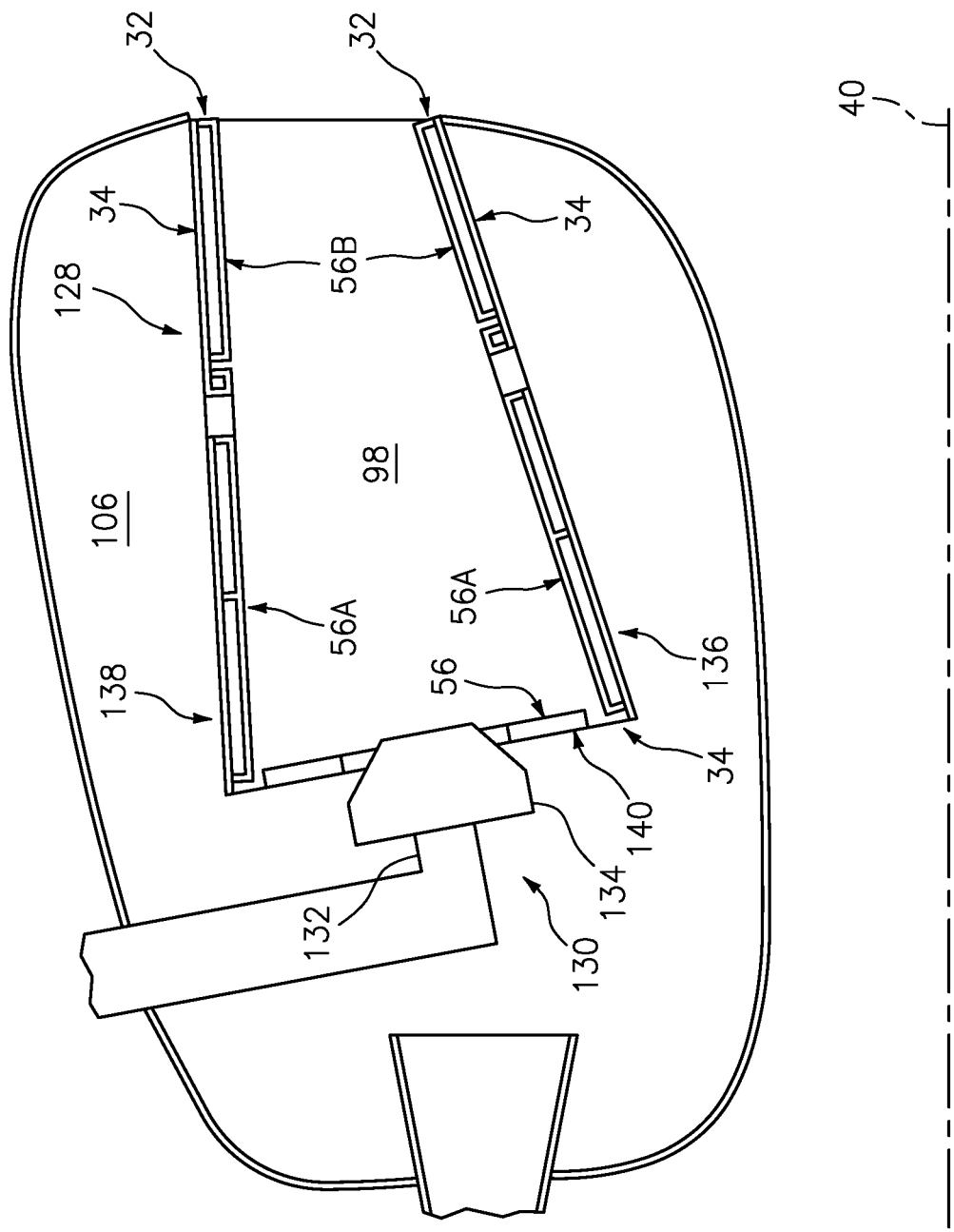
FIG. 20 is a partial side sectional illustration of another assembly with multiple multi-walled structures.

FIG. 20 illustrates another assembly 126 for the gas turbine engine. This turbine engine assembly 126 includes a combustor 128 and one or more fuel injector assemblies 130 (one visible in FIG. 20). Briefly, each fuel injector assembly 130 may include a fuel injector 132 and a swirler 134 mated with the fuel injector 132.

The combustor 128 includes an inner combustor wall 136, an outer combustor wall 138 and a combustor bulkhead 140.

The combustor 128 may be configured as an annular combustor. Each of the inner and outer combustor walls 136 and 138, for example, may be a tubular wall that extends circumferentially around the axial centerline 40. The combustor bulkhead 140 may be an annular wall that extends circumferentially around the axial centerline 40 and radially from the inner combustor wall 136 to the outer combustor wall 138. One, some or each of the combustor components 136, 138 and 140 may be configured with the multi-walled structure 32 configuration described above.

Figure 21:
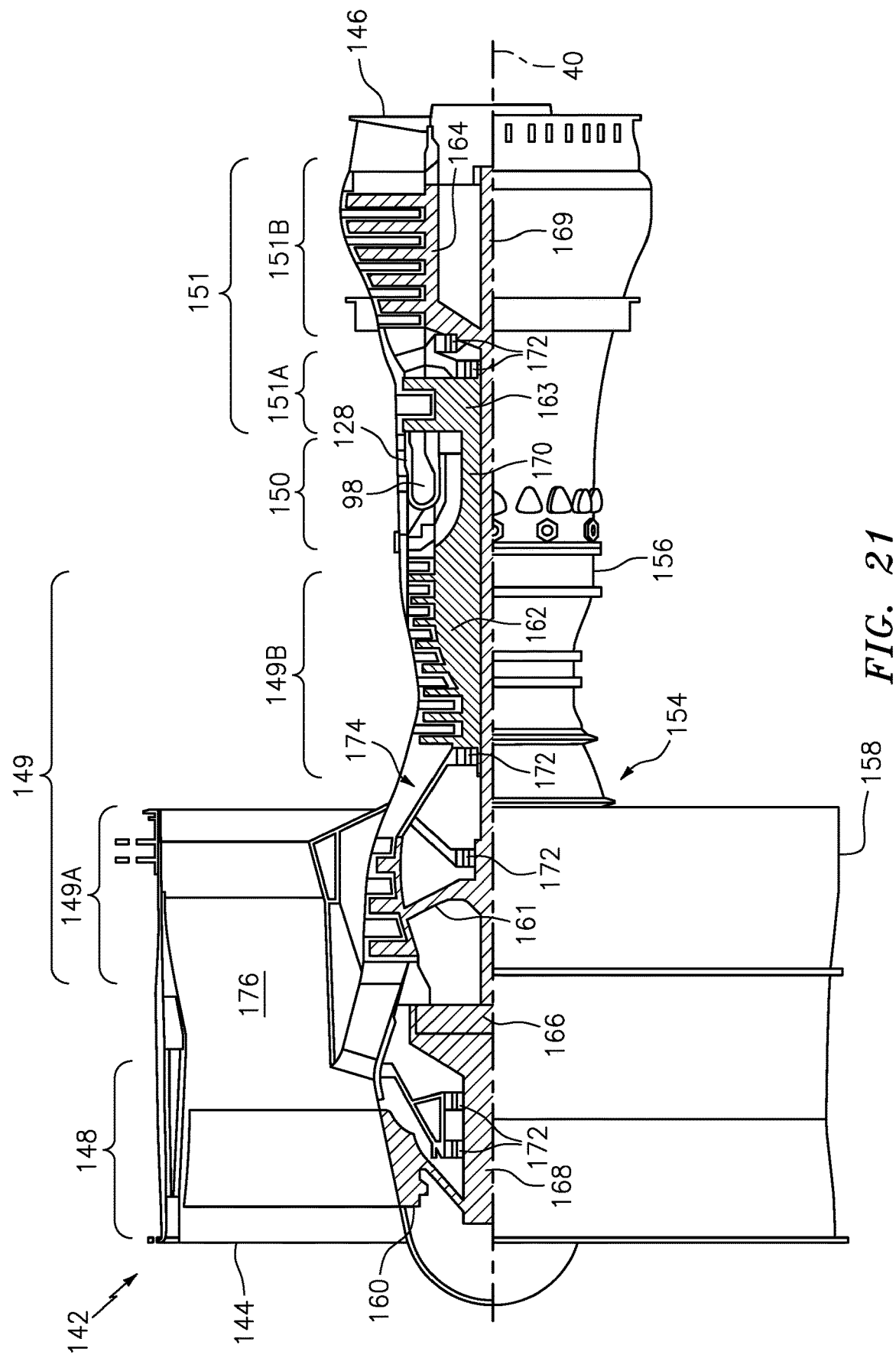
FIG. 21 is a side cutaway illustration of a geared turbofan gas turbine engine.

FIG. 21 is a side cutaway illustration of a geared turbine engine 142 with which the turbine engine assembly 30 of FIG. 1 and/or the turbine engine assembly 126 of FIG. 20 may be configured. The turbine engine 142 extends along an axial centerline (e.g., the axial centerline 40) between an upstream airflow inlet 144 and a downstream airflow exhaust 146. The turbine engine 142 includes a fan section 148, a compressor section 149, a combustor section 150 and a turbine section 151. The compressor section 149 includes a low pressure compressor (LPC) section 149A and a high pressure compressor (HPC) section 149B. The turbine section 151 includes a high pressure turbine (HPT) section 151A and a low pressure turbine (LPT) section 151B.

The engine sections 148-151B are arranged sequentially along the axial centerline 40 within an engine housing 154. This engine housing 154 includes an inner case 156 (e.g., a core case) and an outer case 158 (e.g., a fan case). The inner case 156 may house one or more of the engine sections 149A-151B; e.g., an engine core. The outer case 158 may house at least the fan section 148.

Each of the engine sections 148, 149A, 149B, 151A and 151B includes a respective rotor 160-164. Each of these rotors 160-164 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 160 is connected to a gear train 166, for example, through a fan shaft 168. The gear train 166 and the LPC rotor 161 are connected to and driven by the LPT rotor 164 through a low speed shaft 169. The HPC rotor 162 is connected to and driven by the HPT rotor 163 through a high speed shaft 170. The shafts 168-170 are rotatably supported by a plurality of bearings 172; e.g., rolling element and/or thrust bearings. Each of these bearings 172 is connected to the engine housing 154 by at least one stationary structure such as, for example, an annular support strut.

During operation, air enters the turbine engine 142 through the airflow inlet 144. This air is directed through the fan section 148 and into a core gas path 174 and a bypass gas path 176. The core gas path 174 extends sequentially through the engine sections 149A-151B. The air within the core gas path 174 may be referred to as "core air". The bypass gas path 176 extends through a bypass duct, which bypasses the engine core. The air within the bypass gas path 176 may be referred to as "bypass air".

The core air is compressed by the compressor rotors 161 and 162 and directed into the combustion chamber 98 of the combustor 128 in the combustor section 150. Fuel is injected into the combustion chamber 98 and mixed with the compressed core air to provide a fuel-air mixture. This fuel air mixture is ignited and combustion products thereof flow through and sequentially cause the turbine rotors 163 and 164 to rotate. The rotation of the turbine rotors 163 and 164 respectively drive rotation of the compressor rotors 162 and 161 and, thus, compression of the air received from a core airflow inlet. The rotation of the turbine rotor 164 also drives rotation of the fan rotor 160, which propels bypass air through and out of the bypass gas path 176. The propulsion of the bypass air may account for a majority of thrust generated by the turbine engine 142, e.g., more than seventy-five percent (75%) of engine thrust. The turbine engine 142 of the present disclosure, however, is not limited to the foregoing exemplary thrust ratio.

The turbine engine assembly 30, 126 may be included in various turbine engines other than the one described above. The turbine engine assembly 30, 126, for example, may be included in a geared turbine engine where a gear train connects one or more shafts to one or more rotors in a fan section, a compressor section and/or any other engine section. Alternatively, the turbine engine assembly 30, 126 may be included in a turbine engine configured without a gear train. The turbine engine assembly 30, 126 may be included in a geared or non-geared turbine engine configured with a single spool, with two spools (e.g., see FIG. 21), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:
a multi-walled structure including a cold wall, a hot wall and a cooling cavity vertically between the cold wall and the hot wall;
the cold wall comprising a plurality of cold wall apertures fluidly coupled with the cooling cavity, the plurality of cold wall apertures configured to subject the cold wall to a cold wall pressure drop vertically across the cold wall, and each of the plurality of cold wall apertures extending vertically through the cold wall; and
the hot wall comprising a plurality of hot wall apertures fluidly coupled with the cooling cavity, the plurality of hot wall apertures configured to subject the hot wall to a hot wall pressure drop vertically across the hot wall that is greater than or equal to the cold wall pressure drop, and each of the plurality of hot wall apertures extending vertically through the hot wall.

2. The assembly of claim 1, wherein the multi-walled structure is configured such that the cold wall pressure drop is equal to between five percent and forty-five percent of a total pressure drop vertically across the multi-walled structure.

3. The assembly of claim 1, wherein the multi-walled structure is configured such that the hot wall pressure drop is equal to between fifty-five percent and ninety five percent of a total pressure drop vertically across the multi-walled structure.

4. The assembly of claim 1, wherein the hot wall pressure drop is at least one and one-quarter times the cold wall pressure drop.

5. The assembly of claim 1, wherein the plurality of cold wall apertures comprise an impingement aperture configured to direct a jet of cooling fluid to impinge against the hot wall.

6. The assembly of claim 1, wherein
the plurality of cold wall apertures comprise a first cold wall aperture that extends through the cold wall along a cold wall aperture centerline; and
the cold wall aperture centerline is angularly offset from an interior surface of the cold wall by an acute angle.

7. The assembly of claim 1, wherein the plurality of hot wall apertures comprise an effusion aperture configured to direct cooling fluid out of the cooling cavity into a plenum and along an exterior surface of the hot wall.

8. The assembly of claim 1, wherein the plurality of hot wall apertures comprise a first hot wall aperture that extends through the hot wall along a hot wall aperture centerline with a tortuous trajectory.

9. The assembly of claim 8, wherein a longitudinal length of the first hot wall aperture along the hot wall aperture centerline is greater than a thickness of the hot wall.

10. The assembly of claim 1, wherein
the plurality of cold wall apertures comprise a first cold wall aperture that extends through the cold wall along a cold wall aperture centerline, and at least a portion of the cold wall aperture centerline that extends to an interior surface of the cold wall defining the cooling cavity has a trajectory with a component in a first direction and a component in a vertical direction; and
the plurality of hot wall apertures comprise a first hot wall aperture that extends through the hot wall along a hot wall aperture centerline, and at least a portion of the hot wall aperture centerline that extends from an interior surface of the hot wall defining the cooling cavity has a trajectory with a component in the first direction and a component in the vertical direction.

11. The assembly of claim 1, wherein
the plurality of cold wall apertures comprise a first cold wall aperture that extends through the cold wall along a cold wall aperture centerline, and at least a portion of the cold wall aperture centerline that extends to an interior surface of the cold wall defining the cooling cavity has a trajectory with a component in a first direction and a component in a vertical direction; and
the plurality of hot wall apertures comprise a first hot wall aperture that extends through the hot wall along a hot wall aperture centerline, at least a portion of the hot wall aperture centerline that extends from an interior surface of the hot wall defining the cooling cavity has a trajectory with a component in a second direction and a component in the vertical direction, and the second direction is different from the first direction.

12. The assembly of claim 1, wherein the plurality of hot wall apertures comprise a first hot wall aperture with a diffusion outlet portion.

13. The assembly of claim 1, wherein
the plurality of cold wall apertures comprise a first cold wall aperture with a first diameter; and
the plurality of hot wall apertures comprise a first hot wall aperture with a second diameter that is less than the first diameter.

14. The assembly of claim 1, wherein
the plurality of cold wall apertures consist of a first quantity of cold wall apertures; and
the plurality of hot wall apertures consist of a second quantity of hot wall apertures that is less than the first quantity of cold wall apertures.

15. The assembly of claim 1, wherein
the cold wall is configured with a first percentage of open area to the cooling cavity; and
the hot wall is configured with a second percentage of open area from the cooling cavity that is less than the first percentage of open area.

16. The assembly of claim 1, further comprising a combustor of the gas turbine engine, the combustor comprising the multi-walled structure.

17. An assembly for a gas turbine engine, comprising:
a multi-walled structure including a cold wall, a hot wall and a cooling cavity vertically between the cold wall and the hot wall;
the cold wall comprising a plurality of cold wall apertures fluidly coupled with the cooling cavity, the plurality of cold wall apertures providing the cold wall with a first percentage of open area, and each of the plurality of cold wall apertures extending vertically through the cold wall;
the hot wall comprising a plurality of hot wall apertures fluidly coupled with the cooling cavity, the plurality of hot wall apertures providing the hot wall with a second percentage of open area that is less than the first percentage of open area, and each of the plurality of hot wall apertures extending vertically through the hot wall.

18. An assembly for a gas turbine engine, comprising:
a multi-walled structure including a cold wall, a hot wall and a cooling cavity between and formed by the cold wall and the hot wall;
the cold wall comprising a plurality of cold wall apertures fluidly coupled with the cooling cavity, the plurality of cold wall apertures comprising a first cold wall aperture that extends through the cold wall along a cold wall aperture centerline that is angularly offset from an interior surface of the cold wall by an acute angle; and
the hot wall comprising a plurality of hot wall apertures fluidly coupled with the cooling cavity, and the plurality of hot wall apertures comprise a first hot wall aperture that extends through the hot wall along a hot wall aperture centerline with a tortuous trajectory;
wherein at least a portion of the cold wall aperture centerline that extends to an interior surface of the cold wall defining the cooling cavity has a cold wall aperture centerline trajectory with a component in a lateral or longitudinal first direction and a component in a vertical direction; and
wherein at least a portion of the hot wall aperture centerline that extends from an interior surface of the hot wall defining the cooling cavity has a hot wall aperture centerline trajectory with a component in a lateral or longitudinal second direction and a component in the vertical direction, wherein the lateral or longitudinal second direction is different than the lateral or longitudinal first direction.

19. The assembly of claim 18, wherein a longitudinal length of the first hot wall aperture along the hot wall aperture centerline is greater than a thickness of the hot wall and less than or equal to twenty times the thickness of the hot wall.

20. The assembly of claim 18, wherein the lateral or longitudinal second direction is one of opposite to or perpendicular to the lateral or longitudinal first direction.

* * * * *